US012618457B2

(12) United States Patent (10) Patent No.: US 12,618,457 B2

Levasseur et al. (45) Date of Patent: May 5, 2026

(54) DOUBLE CAM ACTUATION SYSTEM FOR CVT

(71) Applicant: CVTech-IBC inc., Drummondville (CA)

(72) Inventors: David Levasseur, Drummondville (CA); Samuel Paul, Drummondville (CA); Pierre Lebel, Drummondville (CA); Pascal Thibodeau, Drummondville (CA)

(73) Assignee: CVTECH-IBC INC., Drummondville (CA)

( * ) Notice: Subject to any disclaimer, the term of this patent is extended or adjusted under 35 U.S.C. 154(b) by 0 days.

(21) Appl. No.: 18/917,803

(22) Filed: Oct. 16, 2024

(65) Prior Publication Data

US 2025/0122925 A1 Apr. 17, 2025

Related U.S. Application Data

(60) Provisional application No. 63/559,688, filed on Feb. 29, 2024, provisional application No. 63/544,606, filed on Oct. 17, 2023.

(51) Int. Cl.
*F16H 25/12* (2006.01)
*F16H 9/18* (2006.01)

(52) U.S. Cl.
CPC ............. *F16H 25/125* (2013.01); *F16H 9/18* (2013.01)

(58) Field of Classification Search
CPC ...... F16H 61/66272; F16H 55/56; F16H 9/18; F16H 63/067; F16H 9/125; F16H 25/186; F16H 25/125

USPC .......................................................... 474/10
See application file for complete search history.

(56) References Cited

U.S. PATENT DOCUMENTS

| | | | |
|---|---|---|---|
| 4,095,479 A | 6/1978 | Lundberg | |
| 4,378,221 A * | 3/1983 | Huff .................... | F16H 61/6625 192/111.1 |
| 4,523,917 A * | 6/1985 | Schildt ................ | F16H 61/6625 474/19 |
| 4,585,429 A | 4/1986 | Marier | |
| 4,694,943 A | 9/1987 | Petrak | |
| 4,735,598 A | 4/1988 | Moroto et al. | |

(Continued)

FOREIGN PATENT DOCUMENTS

| | | |
|---|---|---|
| EP | 1234128 | 9/2003 |
| EP | 1593879 | 11/2005 |

(Continued)

*Primary Examiner* — Henry Y Liu

(74) *Attorney, Agent, or Firm* — Decode Legal Inc.; Mathieu Audet

(57) ABSTRACT

A new scissor-ramp mechanism for a Continuously Variable Transmission (CVT) provides smooth transmission of variation to the width of the groove for the V-belt of the CVT. The scissor-ramp mechanism consists in driving rings that are coaxial, concentric to each other, and rotatable relative to one another, each having a driving abutting facet; and a driven ring having driven abutting facets. The driving abutting facets are adapted to abut against the driven abutting facets, with at least one abutting facet being provided by a helicoidal ramp. Rotating the driving rings relative to one another exerts a contacting section of abutting facets to migrate over the ramp, thereby changing the axial dimension of the scissor-ramp mechanism.

18 Claims, 17 Drawing Sheets

(56) References Cited

U.S. PATENT DOCUMENTS

| | | | | |
|---|---|---|---|---|
| 5,465,819 A | 11/1995 | Weilant et al. | | |
| 5,580,324 A | * 12/1996 | Landry | F16H 55/56 | |
| | | | 474/19 | |
| 5,720,681 A | 2/1998 | Benson | | |
| 6,120,399 A | 9/2000 | Okeson et al. | | |
| 6,146,295 A | 11/2000 | Mor et al. | | |
| 6,149,540 A | 11/2000 | Johnson et al. | | |
| 6,379,274 B1 | 4/2002 | Robert | | |
| 6,413,178 B1 | * 7/2002 | Chamberland | F16H 63/067 | |
| | | | 474/12 | |
| 6,502,479 B1 | 1/2003 | Lee | | |
| 6,949,039 B2 | 9/2005 | Labbé | | |
| 6,953,400 B2 | 10/2005 | Kalies | | |
| 7,044,872 B1 | 5/2006 | Johnson | | |
| 7,300,370 B2 | * 11/2007 | Wood | F16H 63/062 | |
| | | | 474/10 | |
| 7,850,555 B2 | * 12/2010 | Keane | A01D 69/08 | |
| | | | 474/37 | |
| 7,901,308 B2 | * 3/2011 | Binello | F16H 61/66272 | |
| | | | 474/10 | |
| 8,790,199 B2 | 7/2014 | Schoenfelder | | |
| 8,894,520 B2 | 11/2014 | Labbé | | |
| 9,005,058 B2 | * 4/2015 | Ouchida | F16H 61/66272 | |
| | | | 474/19 | |
| 10,054,202 B2 | * 8/2018 | Yokoyama | F16H 61/66272 | |
| 10,267,391 B2 | * 4/2019 | Yao | F16H 61/662 | |
| 10,473,200 B2 | * 11/2019 | Duan | F16H 3/54 | |
| 10,473,213 B2 | * 11/2019 | Huang | F16H 63/062 | |
| 10,711,888 B2 | * 7/2020 | Tardif-Leblanc | F16H 61/662 | |
| 10,941,840 B2 | * 3/2021 | Yao | F16H 9/18 | |
| 11,105,408 B2 | * 8/2021 | Nesti | F16H 9/125 | |

| | | | | |
|---|---|---|---|---|
| 12,146,568 B1 | * 11/2024 | Stoltzfus | F16H 63/067 | |
| 2005/0277502 A1 | * 12/2005 | Wood | F16H 63/062 | |
| | | | 474/19 | |
| 2007/0105671 A1 | * 5/2007 | Binello | F16H 55/56 | |
| | | | 474/19 | |
| 2008/0096703 A1 | * 4/2008 | Labbe | F16H 55/56 | |
| | | | 474/8 | |
| 2008/0102998 A1 | * 5/2008 | Teijido | F16H 61/66272 | |
| | | | 474/19 | |
| 2011/0263363 A1 | 10/2011 | Schoenfelder | | |
| 2012/0214627 A1 | 8/2012 | Ouchida et al. | | |
| 2013/0288833 A1 | 10/2013 | Mueller et al. | | |
| 2016/0208892 A1 | * 7/2016 | Yokoyama | F16H 9/16 | |
| 2017/0363184 A1 | * 12/2017 | Yao | F16H 61/662 | |
| 2018/0080529 A1 | * 3/2018 | Yao | F16H 9/18 | |
| 2018/0080534 A1 | * 3/2018 | Yokoyama | F16H 55/56 | |
| 2018/0180141 A1 | 6/2018 | Kuhl et al. | | |
| 2019/0170231 A1 | * 6/2019 | Duan | F16H 63/065 | |
| 2019/0170249 A1 | * 6/2019 | Huang | B60K 6/485 | |

FOREIGN PATENT DOCUMENTS

| | | |
|---|---|---|
| EP | 2699441 | 2/2014 |
| EP | 3276206 | 1/2018 |
| EP | 3721120 | 1/2023 |
| WO | 2004094874 | 11/2004 |
| WO | 2016157281 | 10/2016 |
| WO | 2018100151 | 6/2018 |
| WO | 2020107103 | 6/2020 |
| WO | 2021075237 | 4/2021 |
| WO | 2021075239 | 4/2021 |
| WO | 2022176001 | 8/2022 |
| WO | 2022208826 | 10/2022 |

* cited by examiner

146

144

148

104

DOUBLE CAM ACTUATION SYSTEM FOR CVT

CROSS-REFERENCE TO RELATED APPLICATION

This application relates to and is a provisional application claiming priority under 35 U.S.C. § 119(e) and 37 C.F.R. § 1.78(a) for a priority claim to earlier-filed provisional applications, U.S. patent application Ser. No. 63/544,606, filed 2023 Oct. 17 under 35 U.S.C. § 111, entitled DOUBLE CAM ACTUATION SYSTEM FOR CVT, and U.S. patent application Ser. No. 63/559,688, filed 2024 Feb. 29 under 35 U.S.C. § 111, entitled DOUBLE RING ACTUATION SYSTEM FOR CVT, the specifications of which are hereby incorporated herein by reference in their entireties.

BACKGROUND

(a) Field

The subject matter disclosed generally relates to a double ring actuation systems for CVT. More particularly, the subject matter disclosed relates to an electrically assisted CVT with a double ring mechanism.

(b) Related Prior Art

Transmissions are mechanisms that transform the speed and torque in vehicles using gears, belts, or other drive components. Most transmission designs use discrete speed ratios: low ratios for acceleration, hill climbing, and heavy hauling, and high ratios for higher-speed travel. They use multiple parallel gear sets between input and output shafts. By sequentially changing which gear set carries the loads between the shafts, the speed ratio between the input and output shafts is altered.

Transmissions have also been designed that are continuously variable (CVTs). These generally use friction to transfer load from an input shaft to an output shaft. By altering the radial position of friction rollers, belts, or other components, the speed ratio is changed.

Mos/t current CVTs rely upon fixed-design mechanical or hydraulic actuation that cannot be easily changed to respond to differing demands, such as varying vehicle cargo loads and operator performance demands. Many solution have been tried to improve flexibility, response time, force requirements, etc. with variable efficiency.

One solution was developed by Steven BENSON, and published as a TORQUE RESPONSIVE ACTUATION DEVICE, publication U.S. Pat. No. 5,720,681 A. BENSON describes a torque responsive actuation device with bearings that travel along individual tracks of track sections of a helix or cam cone, with either opposing bearing or track surface to have a convex surface with a greatest diameter of the convex surface at the surface center so as to provide a point contact between the bearing surfaces that will remain centered during travel of the one surface over the other.

Another solution was developed by PIAGGIO & C SPA, and published as a CONTINUOUSLY VARIABLE TRANSMISSION DEVICE WITH DEVICE FOR VARYING THE TRANSMISSION CURVE, publication U.S. Pat. No. 11,105,408 B2. PIAGGIO describes a continuously variable transmission device that includes a drive pulley, and a cam system operating between a fixed bushing and a mobile bushing configured for transmitting the rotation between the fixed bushing and the mobile bushing and for opposing the movement towards each other of the active surfaces. A driven cam portion of the mobile bushing and a drive cam portion of the fixed bushing respectively having a driven cam profile and a drive cam profile. The described mobile bushing comprises a main wall, annular with respect to the axis of rotation (X), having an inner surface which delimits a housing compartment, and the driven cam portion protrudes radially internally from said inner surface; and the drive cam portion of the fixed bushing is suitable to penetrate axially in the housing compartment of the mobile bushing.

As demonstrated by the above references, and nevertheless the improvements provided by these references, needs remain in the art for CVT actuation systems improvements.

Accordingly, a need has been felt for a solution aimed at a CVT actuation system that is more flexible and adaptable than the current state of technology.

SUMMARY

According to an embodiment, there is provided a scissor-ramp mechanism that is adapted to provide pressure over a CTV pulley wherein contact sections are migrating over ramps as the scissor-ramp mechanism is actuated.

In some aspects, the description herein relates to a scissor-ramp mechanism for a Continuously Variable Transmission, the scissor-ramp mechanism extending along an axis, with the scissor-ramp mechanism being adapted for varying continuous its axial dimension, the scissor-ramp mechanism including a first driving ring and a second driving ring that are coaxial, concentric to each other, and rotatable relative to one another around the axis, each one of the first driving ring and the second driving ring including a driving abutting facet; and a driven ring rotatable around the axis, the driven ring including driven abutting facets; wherein the driving abutting facets are adapted to abut against the driven abutting facets, wherein at least one abutting facet among the driving abutting facets and the driven abutting facets is provided by a first helicoidal ramp, and wherein rotating the driving rings relative to one another exerts a contacting section of the abutting facet provided by the first helicoidal ramp to migrate thereover, thereby changing the axial dimension of the scissor-ramp mechanism.

In some aspects, the description herein relates to a scissor-ramp mechanism, wherein the driven ring is free of a mechanic coupling to the driving rings.

In some aspects, the description herein relates to a scissor-ramp mechanism, wherein rotating the driving rings relative to one another of a first number of degrees exerts a rotation of the driven ring of a second number of degrees that is less than the first number of degrees.

In some aspects, the description herein relates to a scissor-ramp mechanism, further including a second helicoidal ramp, wherein each one of the first helicoidal ramp and the second helicoidal ramp has a rate of an axial extend per degree of rotation, and wherein rotating the driving rings relative to one another exerts a variation of the axial dimension of the scissor-ramp mechanism that is lower than the maximum of the rates of the first helicoidal ramp and of the second helicoidal ramp.

In some aspects, the description herein relates to a scissor-ramp mechanism, wherein the first driving ring includes the first helicoidal ramp and the second driving ring includes a second helicoidal ramp.

In some aspects, the description herein relates to a scissor-ramp mechanism, wherein the first helicoidal ramp extends in a first spin direction, and wherein the second helicoidal ramp extends in a second spin direction opposed to the first spin direction.

In some aspects, the description herein relates to a scissor-ramp mechanism, wherein the first driving ring includes the first helicoidal ramp and a second helicoidal ramp, and wherein the first helicoidal ramp and the second helicoidal ramp extend in a first spin direction, and wherein the first helicoidal ramp and the second helicoidal ramp are offset from one another of a number of degrees that is greater than zero (0).

In some aspects, the description herein relates to a scissor-ramp mechanism, wherein the first helicoidal ramp has a constant rate of an axial extend per degree of rotation between a first position and a second position, wherein the second position is axially distant to the first position of at least 75% of a maximum variation of the axial dimension of the scissor-ramp mechanism between an extended-most position and a compact-most position.

In some aspects, the description herein relates to a scissor-ramp mechanism, wherein the abutment facets includes a roller.

In some aspects, the description herein relates to a scissor-ramp mechanism, wherein the driven ring includes an outer-ring section and an inner-ring section each including an helicoidal axial face, wherein the helicoidal axial face of the outer-ring section includes a first one of the abutting facets of the driven ring and the helicoidal axial face of the inner-ring section includes a second one of the abutting facets of the driven ring.

In some aspects, the description herein relates to a scissor-ramp mechanism, wherein the abutting facet of the inner-ring section and the abutting facet of the outer-ring section are offset relative to one another of a number of degrees greater than zero (0) around the axis.

In some aspects, the description herein relates to a scissor-ramp mechanism, wherein the helicoidal axial face of the outer-ring section includes a clearance-providing section, wherein a clearance remains between the clearance-providing section and the driving rings when the abutting facets of the driving rings abuts against the abutting facets of the driven ring.

In some aspects, the description herein relates to a scissor-ramp mechanism, wherein the driven ring is made of a single component.

In some aspects, the description herein relates to a scissor-ramp mechanism, wherein the scissor-ramp mechanism is adapted to continuously adjust between a compact-most position and an extended-most position, wherein the scissor-ramp mechanism further includes biasing means biasing the scissor-ramp mechanism towards the compact-most position.

In some aspects, the description herein relates to a scissor-ramp mechanism, mounted to a body and a shaft rotatable relative to the body, with the shaft axially coupled to the body, wherein one of the driving rings is fixedly mounted to the body.

In some aspects, the description herein relates to a scissor-ramp mechanism, further including a second helicoidal ramp, wherein each one of the driving rings includes one of the helicoidal ramps, wherein the helicoidal ramps are extending in opposite spin directions, and wherein rotating the driving rings relative to one another exerts the abutting facets of the driven ring to slide simultaneously over the helicoidal ramps of the driving rings.

In some aspects, the description herein relates to a Continuously Variable Transmission (CVT) including the scissor-ramp mechanism, the CVT including an axially-fixed sheave, and an axially-movable sheave coaxially mounted to the scissor-ramp mechanism, wherein the scissor-ramp mechanism is adapted to push against the axially-movable sheave to adjust a width of a V-shaped groove between the sheaves.

In some aspects, the description herein relates to a CVT, further including an actuator assembly coupled to the scissor-ramp mechanism, wherein the actuator assembly is adapted for exerting a rotation of the driving rings relative to one another.

In some aspects, the description herein relates to a method of operating a Continuously Variable Transmission (CVT) having a groove width constrained along an axis, the method including: a) providing a scissor-ramp mechanism adapted to constrain the groove width, including: i) driving rings that are coaxial, concentric to each other, and rotatable relative to one another around the axis, each one of the driving rings including a driving abutting facet; and ii) a driven ring rotatable around the axis, the driven ring including driven abutting facets, wherein at least one abutting facet among the driving abutting facets and the driven abutting facets is provided by a first helicoidal ramp; and b) rotating the driving rings one relative to another in a first spin direction through which the driving abutting facets are abutting against the driven abutting facets with a contacting section of the abutting facet provided by the first helicoidal ramp being exerted to migrate thereover in a first migrating direction, thereby increasing an axial dimension of the scissor-ramp mechanism and thereby causing the groove width to decrease.

In some aspects, the description herein relates to a method, further including: c) providing a biasing means adapted to bias the driven ring towards the driving rings; and d) rotating the driving rings one relative to another in a second spin direction such that the contacting section being exerted to migrate thereover in a second migrating direction by the biasing means, thereby decreasing the axial dimension of the scissor-ramp mechanism causing the groove width to increase.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
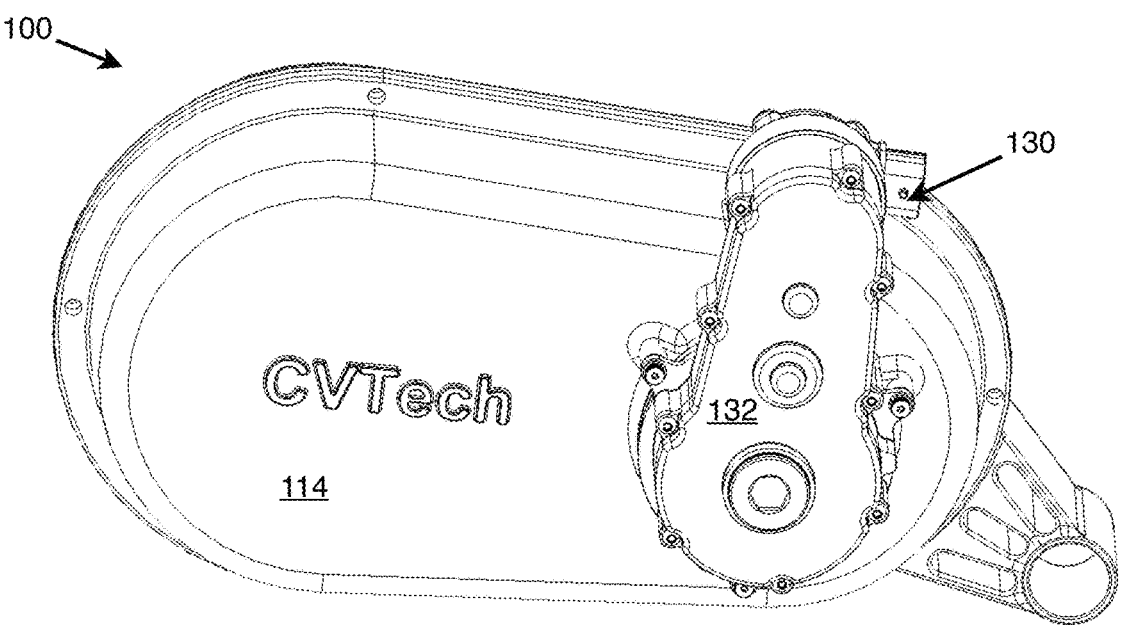
FIG. 1 is a CVT front perspective view in accordance with an embodiment.
Figure 2:
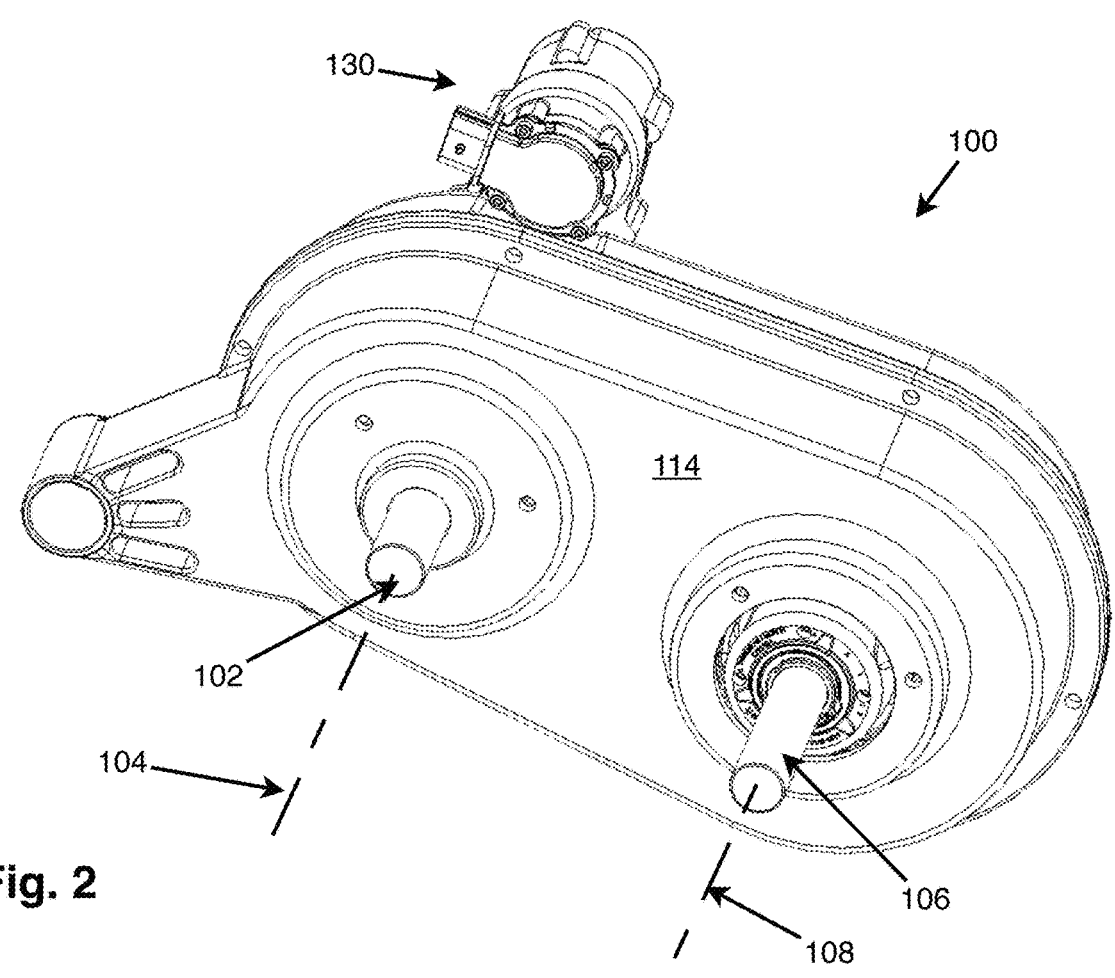
FIG. 2 is a CVT rear perspective view.
Figure 3:
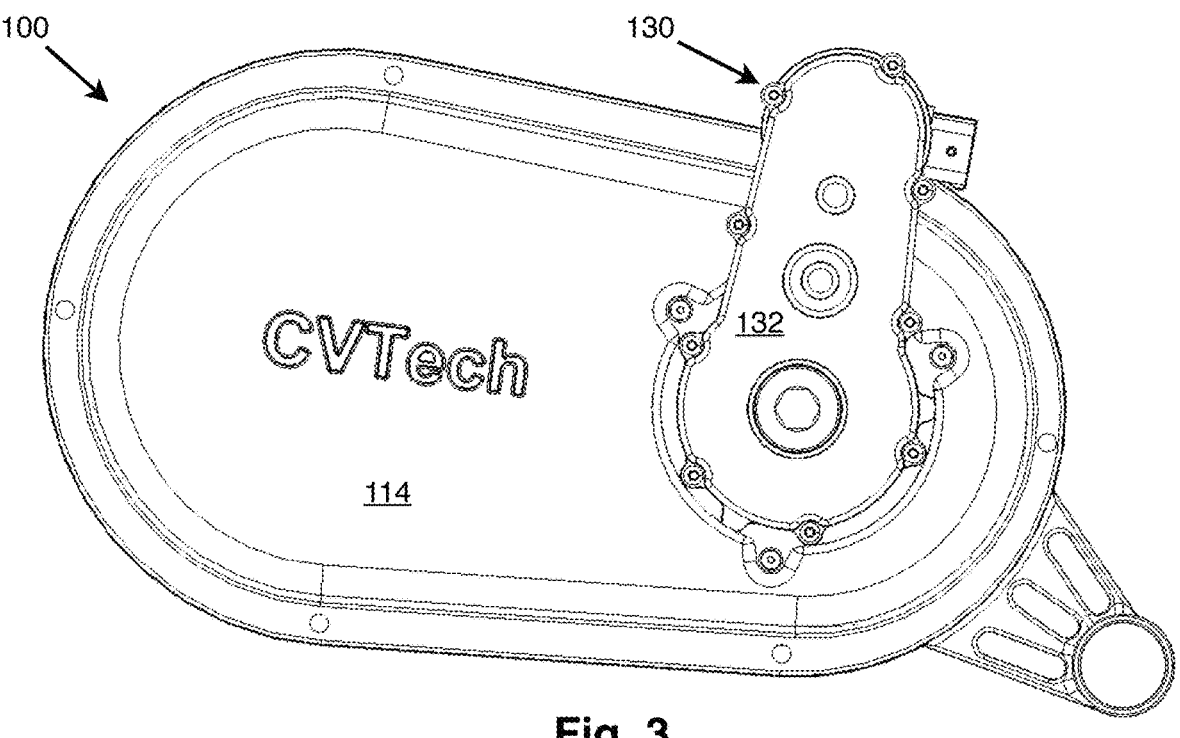
FIG. 3 is a CVT front elevation view.
Figure 4:
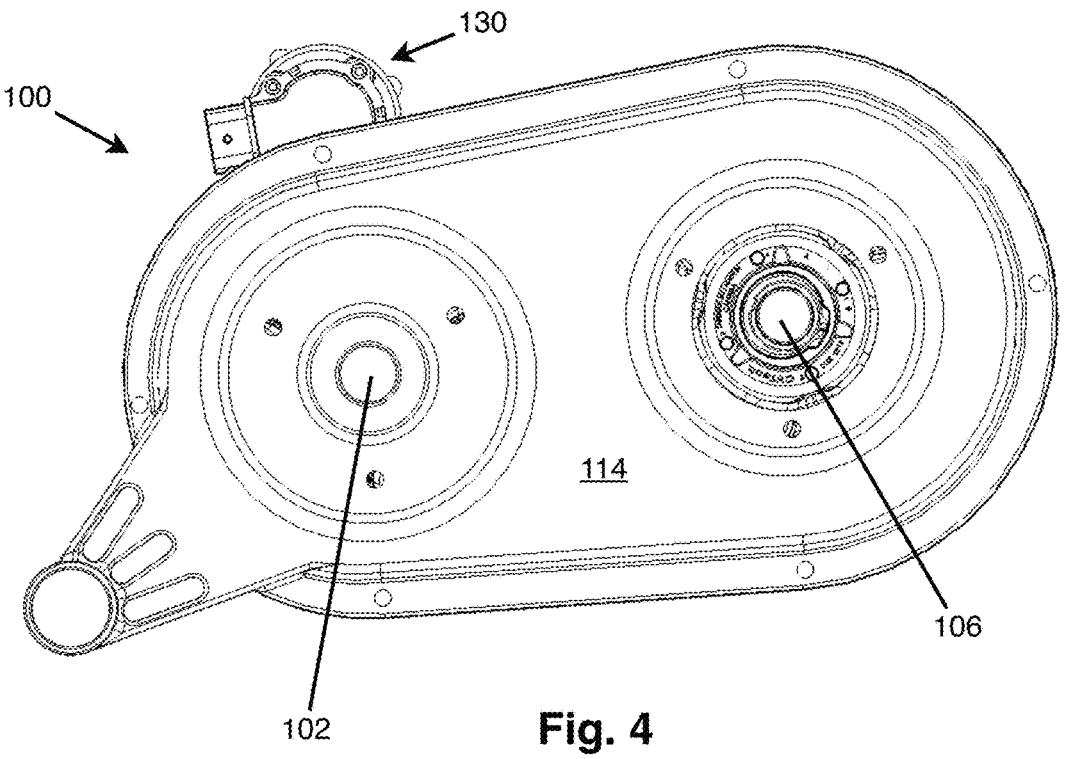
FIG. 4 is a CVT rear elevation view.
Figure 5:
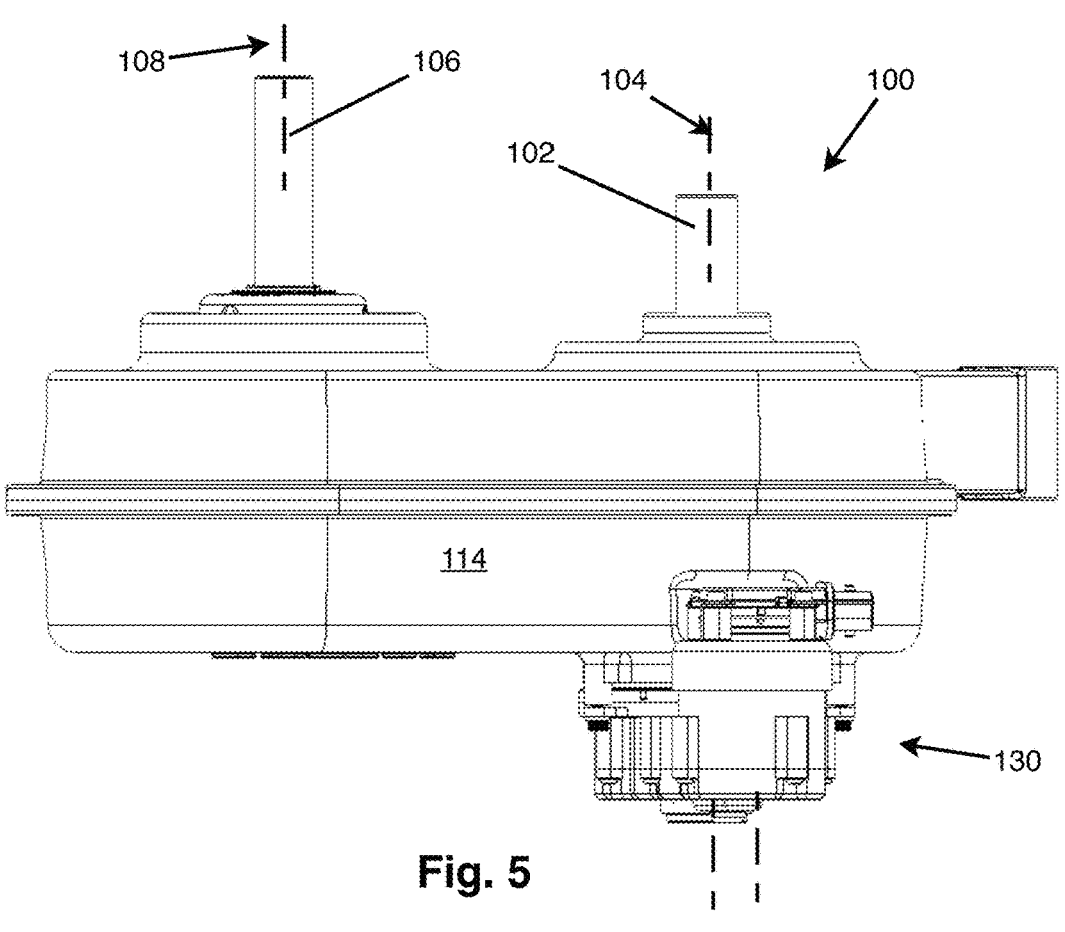
FIG. 5 is a CVT top view.

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about", "approximately", or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as", or the like) provided herein, is intended merely to better illuminate the exemplary realizations and does not pose a limitation on the scope of the realizations. No language in the specification should be construed as indicating any unclaimed element as essential to the practice of the realizations. The use of the term "substantially" is intended to mean "for the most part" or "essentially" depending on the context. It is to be construed as indicating that some deviation from the word it qualifies is acceptable as would be appreciated by one of ordinary skill in the art to operate satisfactorily for the intended purpose.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal", "interior" and "exterior" and the like are intended to be construed in their normal meaning.

It should further be noted that for purposes of this disclosure, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members, or the two members and any additional intermediate members being integrally formed as a single unitary body with one another or with the two members or the two members and any additional intermediate members being attached to one another. Such joining may be permanent in nature or alternatively may be removable or releasable in nature.

Referring to the drawings, wherein like components are referred to with like reference numbers, FIGS. 1 to 8, depict a continuously variable transmission, aka CVT 100, for a powertrain, such as a vehicle powertrain or for a power transmission system for stationary system, such as a conveyor. The vehicle, including by way of non-limiting examples, may be a passenger vehicle, a light-duty or heavy-duty truck, a utility vehicle, an agricultural vehicle, an industrial/warehouse vehicle, a recreational off-road vehicle, a robotic device, or an aeronautic device. Alternatively, the CVT 100 can be used with other kinds of machines that are not vehicle, which is also contemplated therein. The CVT 100 includes an input shaft 102 rotatable about an input axis 104, and an output shaft 106 rotatable about an output axis 108. The output axis 108 is also referred to herein as a first axis of rotation, and the input axis 104 is referred to herein as a second axis of rotation. The input axis 104 and the output axis 108 are generally parallel with one another. The CVT 100 includes a casing 114 enclosing the components.

A powertrain consists in a power source (not shown) such as an engine, e.g., internal combustion engine, electrical engine, hydraulic engine, that is operatively connected to drive the input shaft 102. The power source provides a driving torque on the input shaft 102. The powertrain is adapted to undergo a load, also referred to as a torque load, such as load resulting from forcing the vehicle wheels to rotate at a speed with an acceleration, with the wheels being driven by the output shaft 106. The input shaft 102 may be also referred to as a drive shaft and the output shaft 106 may be also referred to as a driven shaft.

Figure 9:
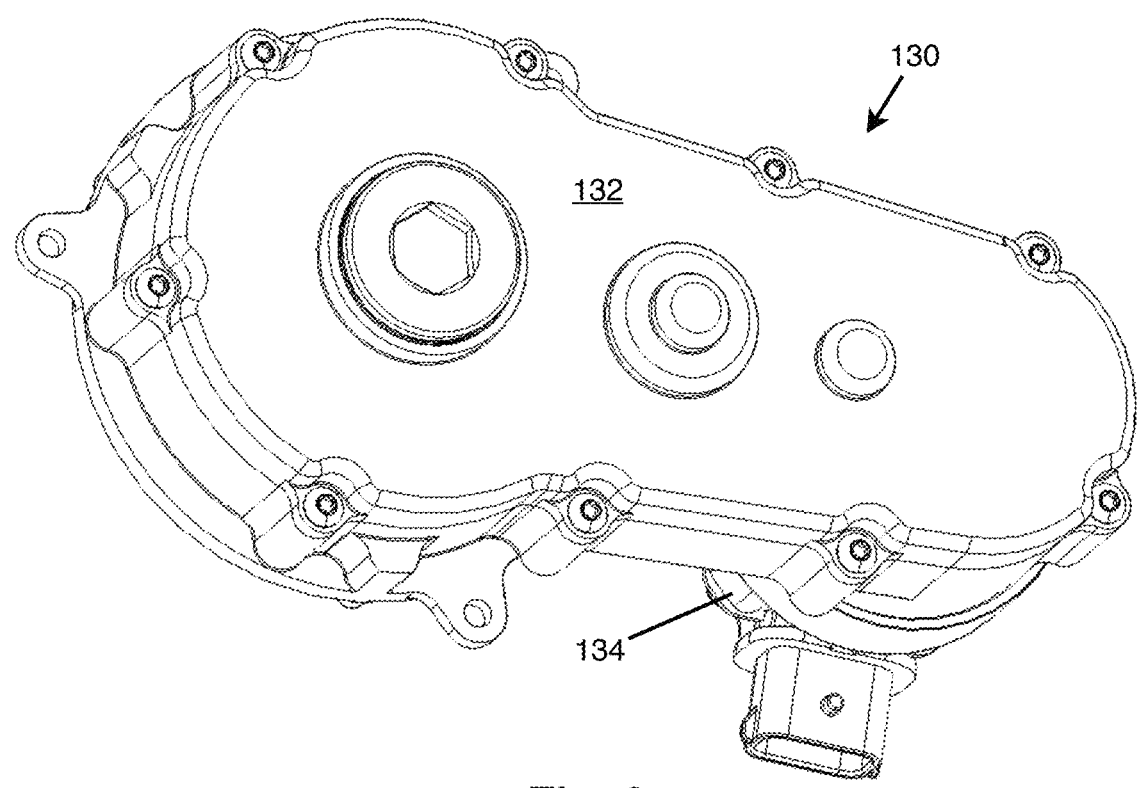
FIG. 9 is a perspective view of the actuator assembly.
Figure 10:
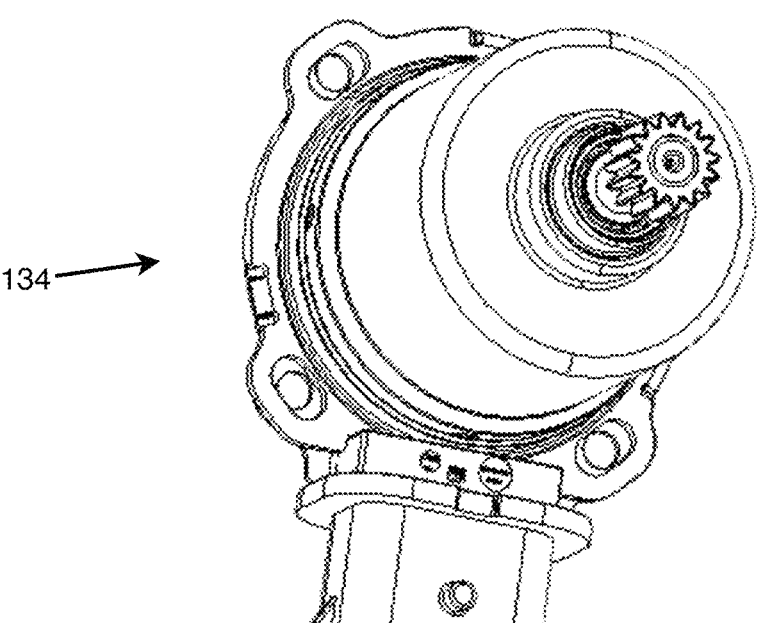
FIG. 10 is a perspective view of the actuator part of the actuator assembly.
Figure 11:
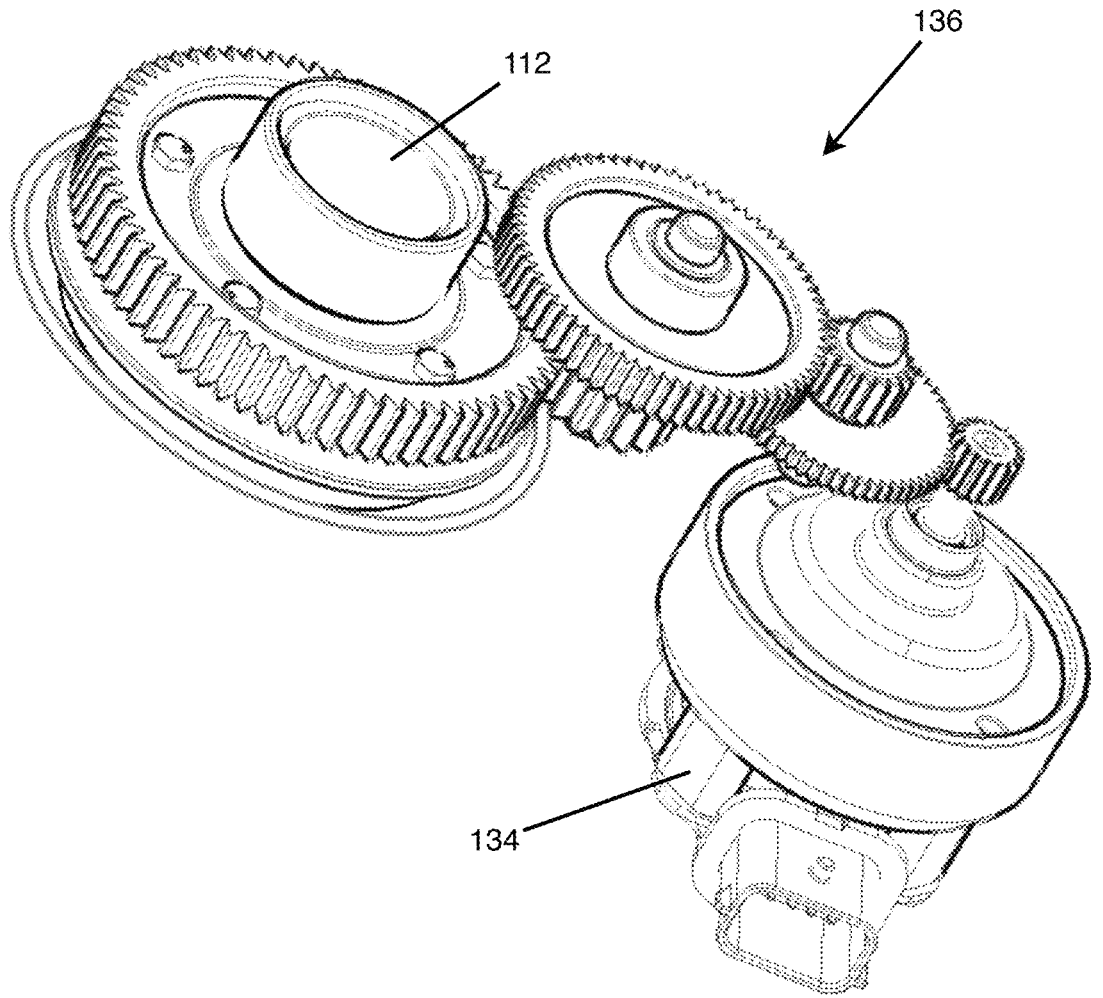
FIG. 11 is a perspective view of the gear assembly of the actuator assembly.

Referring additionally to FIGS. 9 to 11, the CVT 100 includes an actuator assembly 130 that enables a controlled, continuously variable speed ratio between the input shaft 102 and the output shaft 106, and serves to modulate torque and speed transmission between the input shaft 102 and the output shaft 106. The actuator assembly 130 includes a casing 132; an actuator motor 134, typically embodied without limitation as an electric motor connected to a controller, mounted to the casing 132; and a gear assembly 136 mounted to the casing 132 and coupling the actuator motor 134 to the input shaft 102. The casing 132, through controlled angulation rotation, controls the width 154 of the groove 152 of the actuated pulley 142 and therefore modulates the torque and speed transmitted between the input shaft 102 and the output shaft 106 as explained hereinafter.

It is to be noted that the transmission assembly between the casing 132 and the input shaft 102, herein embodied by the gear assembly 136, may be performed otherwise. The present document contemplated therethrough alternative transmission means such as, e.g., belt, chain, direct shaft, and gear assemblies of similar and other transmission ratios.

It is further contemplated that based on the general configuration of the e.g., vehicle or system, the actuator assembly 130 may be oriented otherwise, being longer or shorter, having another general orientation than the one depicted relative to the shafts 102, 106, based on e.g., the general configuration of the e.g., vehicle, the power and speed requirements needed from the actuator motor 134, size of the actuator motor 134, whether or not the actuator motor 134 requires to be ventilated, etc. Therefore, the present CVT 100, through is characteristics, may adopt a variety of configurations without departing from the spirit of the present description.

It is to be noted that since the present solution for a CVT 100 allows to decrease the physical parts needed in the CVT 100, the power and speed required from the actuator motor 134, and/or e.g., gear ratio closer to 1:1 in the actuator assembly 130, the present CVT 100 features more flexibility on the configurations it may adopt than CVTs available nowadays.

Figure 6:
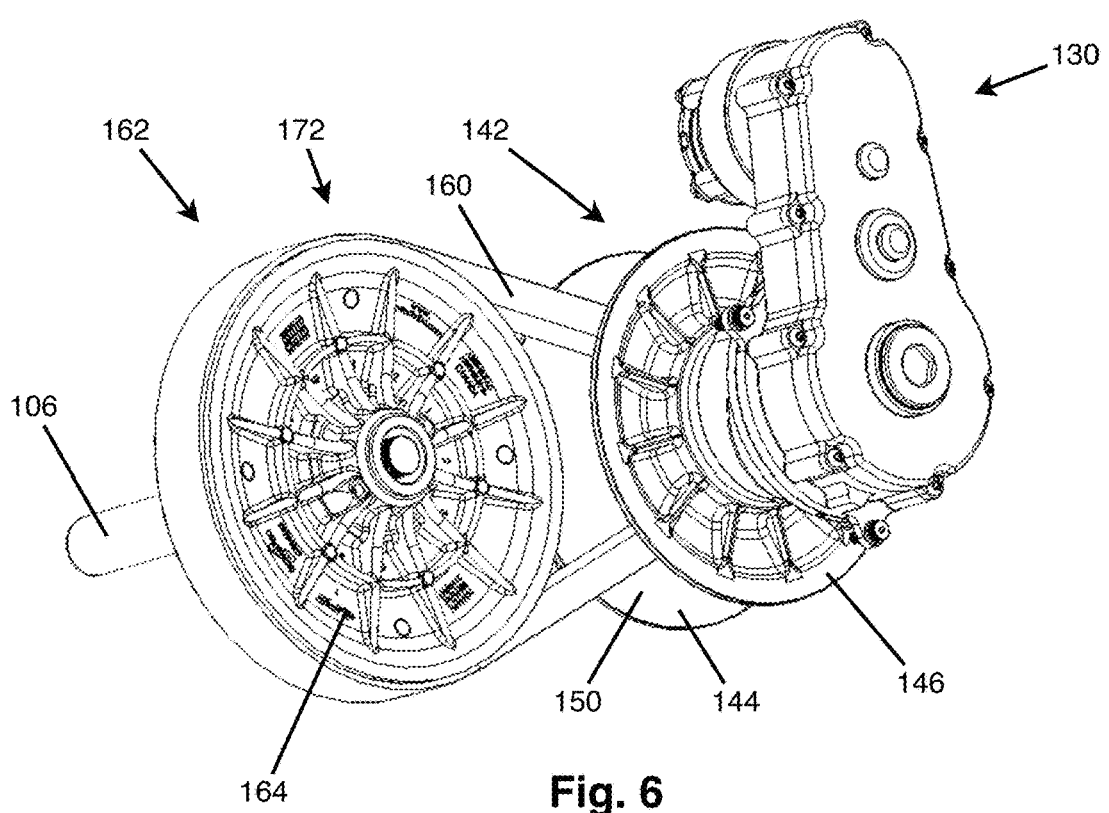
FIG. 6 is a CVT front perspective view without housing.
Figure 7:
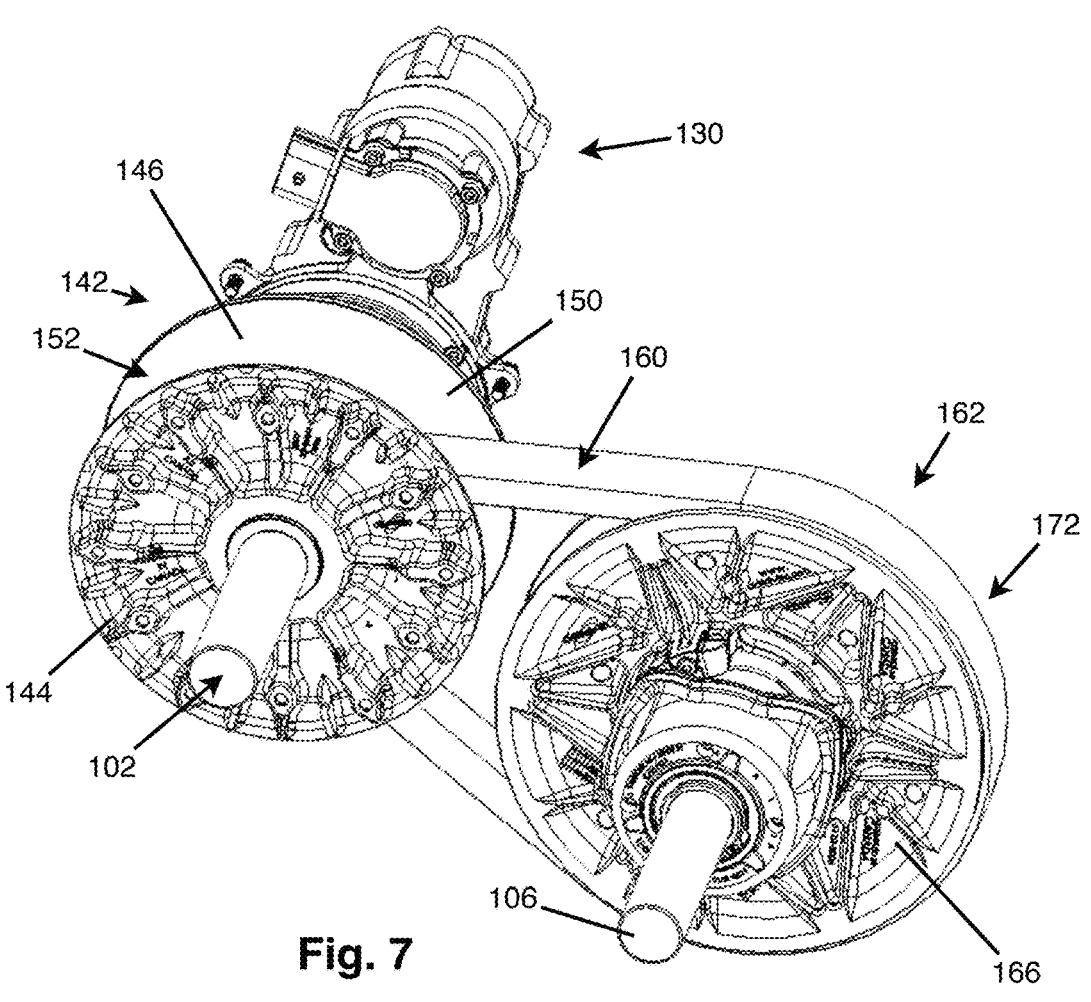
FIG. 7 is a CVT rear perspective view without housing.
Figure 8:
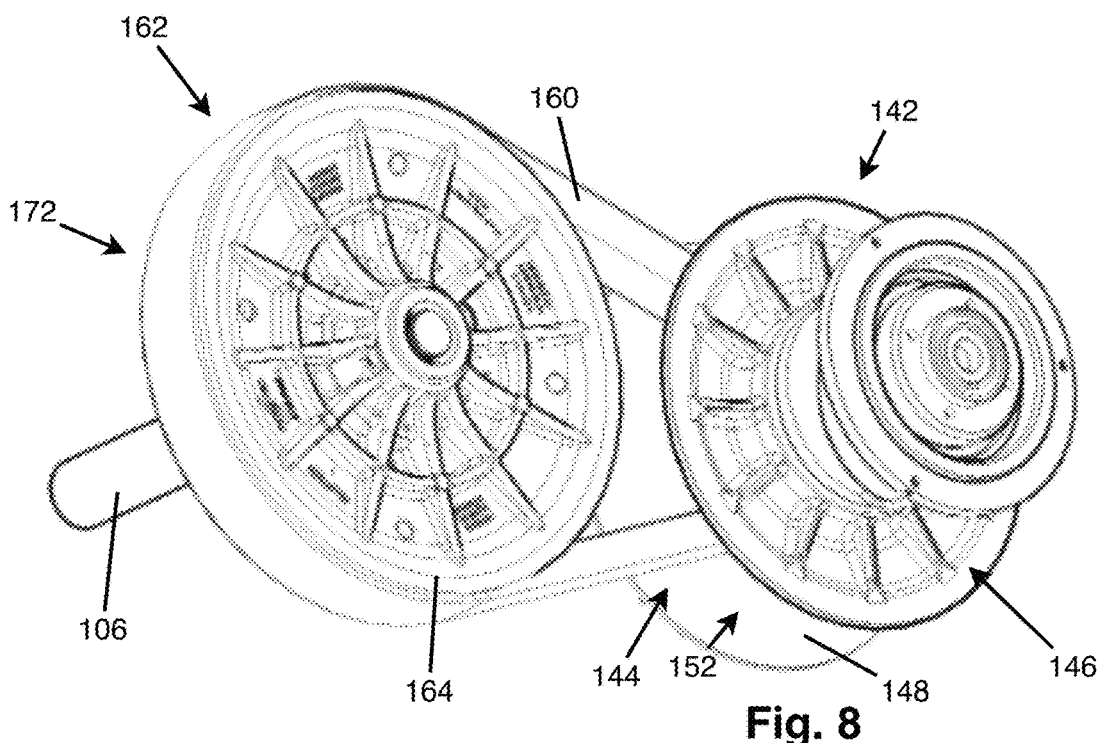
FIG. 8 is a CVT front perspective view without housing and without actuator assembly.

Referring particularly to FIGS. 6 to 8, the actuated pulley 142 mounted to the input shaft 102 includes an axially-fixed sheave 144 and an axially-movable sheave 146. The axially-fixed sheave 144 is constrained from axial movement relative to the input shaft 102 (i.e., in a direction along the input axis 104). The axially-movable sheave 146 is mounted to the input shaft 102 such as being splined thereto while able of axial translation along axis 104, to increase and decrease width of the V-shaped groove 152 defined by the inner surfaces 148, 150 of the two sheaves 144, 146.

The input shaft 102 is coupled to the output shaft 106 through a belt 160 coupling the actuated pulley 142 to the output pulley 162.

The output pulley 162 similarly comprises an axially-fixed sheave 164 and an axially-movable sheave 166, with the inner surfaces (not identified) of the sheaves 164, 166 forming also a V-shaped groove 172 having a controllable width.

Power transmission from the input shaft 102 and the output shaft 106 is modulated by controlling the width 154 of the groove 152 to control the radius of curvature at the input side of the belt 160, with the output pulley 162 adjusting, increasing or decreasing, automatically the width of the groove 172. The output pulley 162 comprises a spring and cam mechanism forcing the width of its groove 172 to decrease when the width 154 of the groove 152 of the actuated pulley 142 increases, preventing the belt 160 from loosening up and from unwanted slipping on the pulleys 142, 162.

Figure 12:
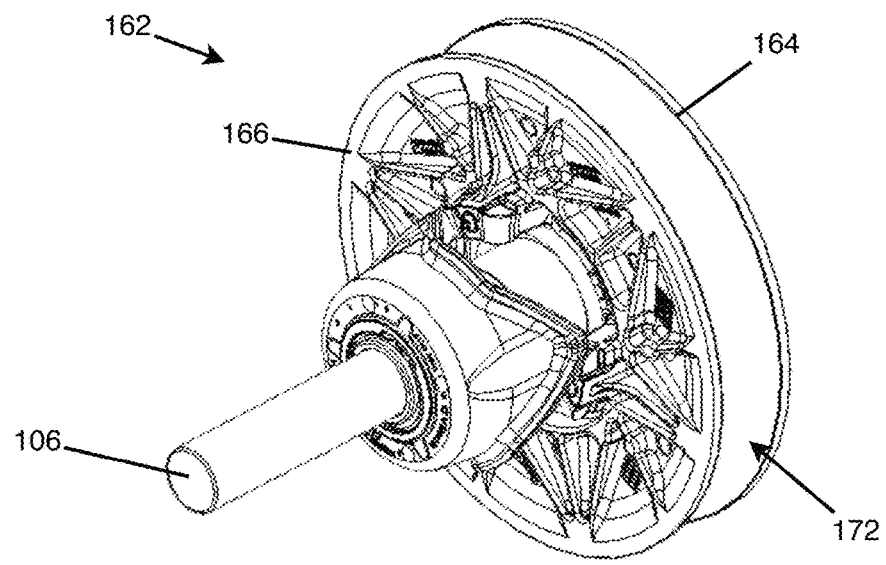
FIG. 12 is a rear perspective view of the power transmission pulley.
Figure 13:
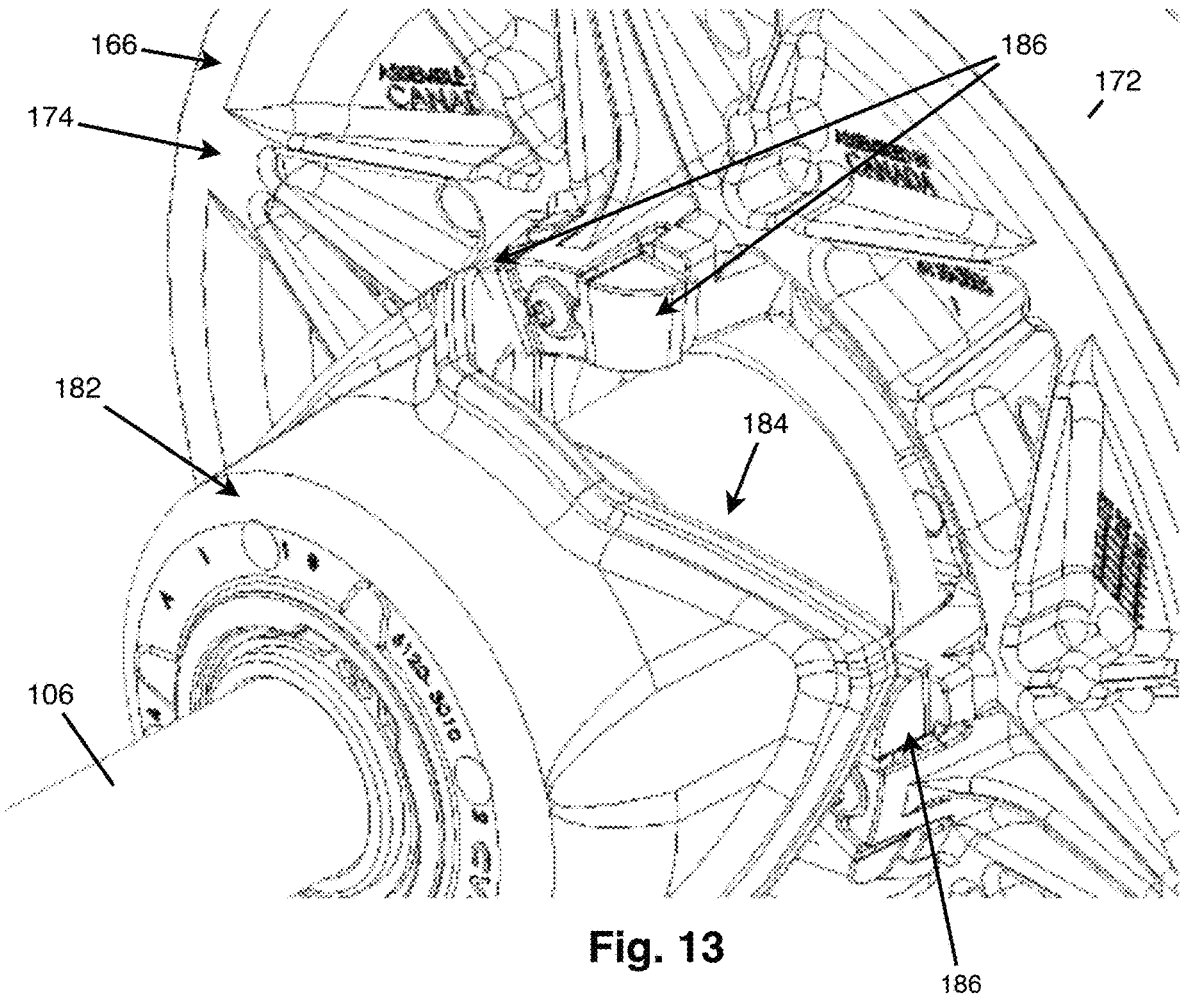
FIG. 13 is a close-up rear perspective view of the power transmission pulley.
Figure 14:
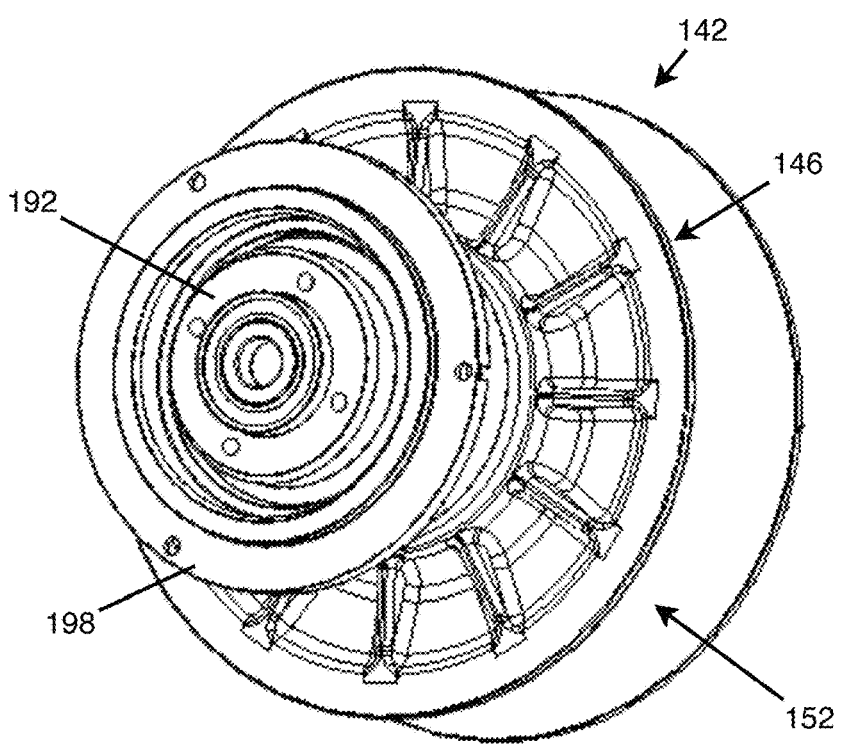
FIG. 14 is a rear perspective view of the actuated pulley.
Figure 15:
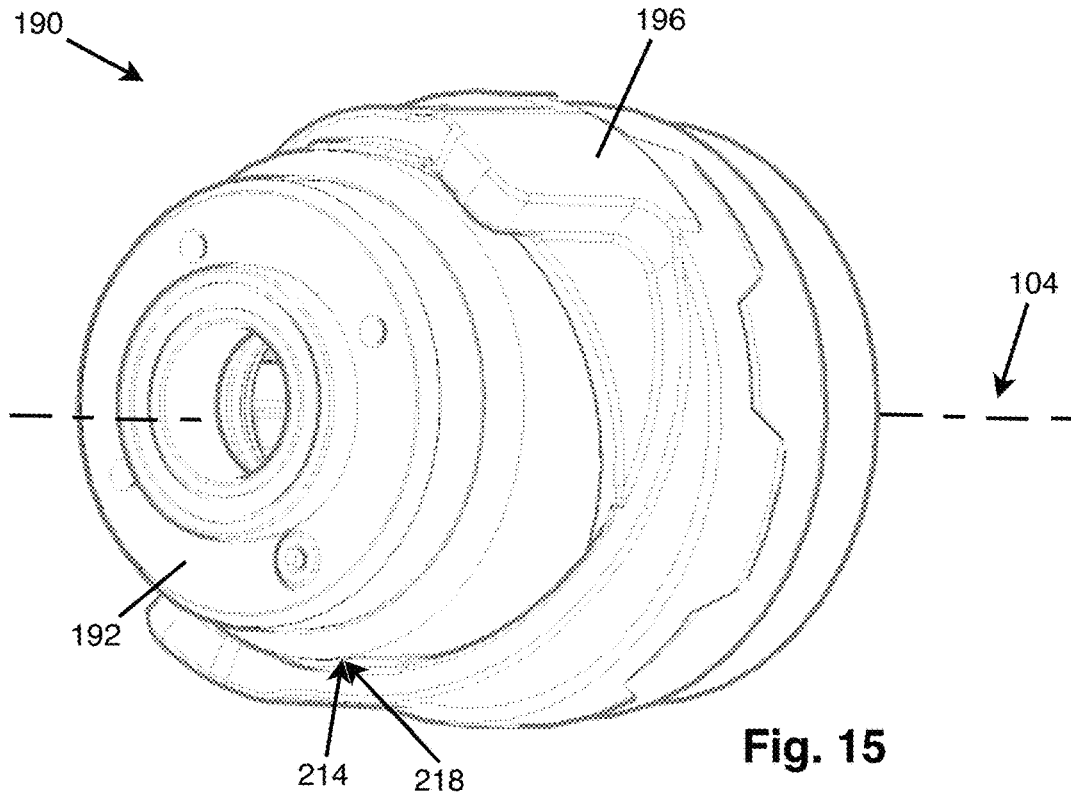
FIG. 15 is a front perspective view of a scissor-ramp assembly without the static ring depicted.
Figure 16:
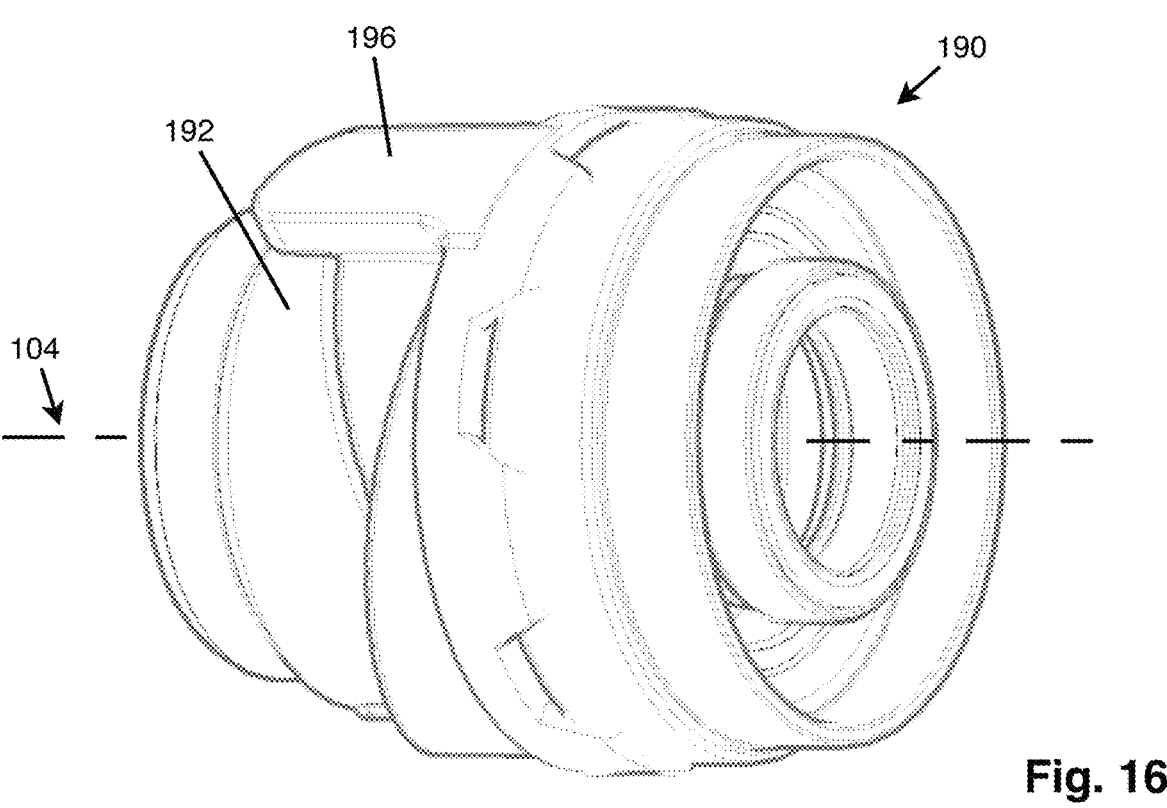
FIG. 16 is a rear perspective view of the scissor-ramp assembly of FIG. 15 without the static depicted.
Figure 17:
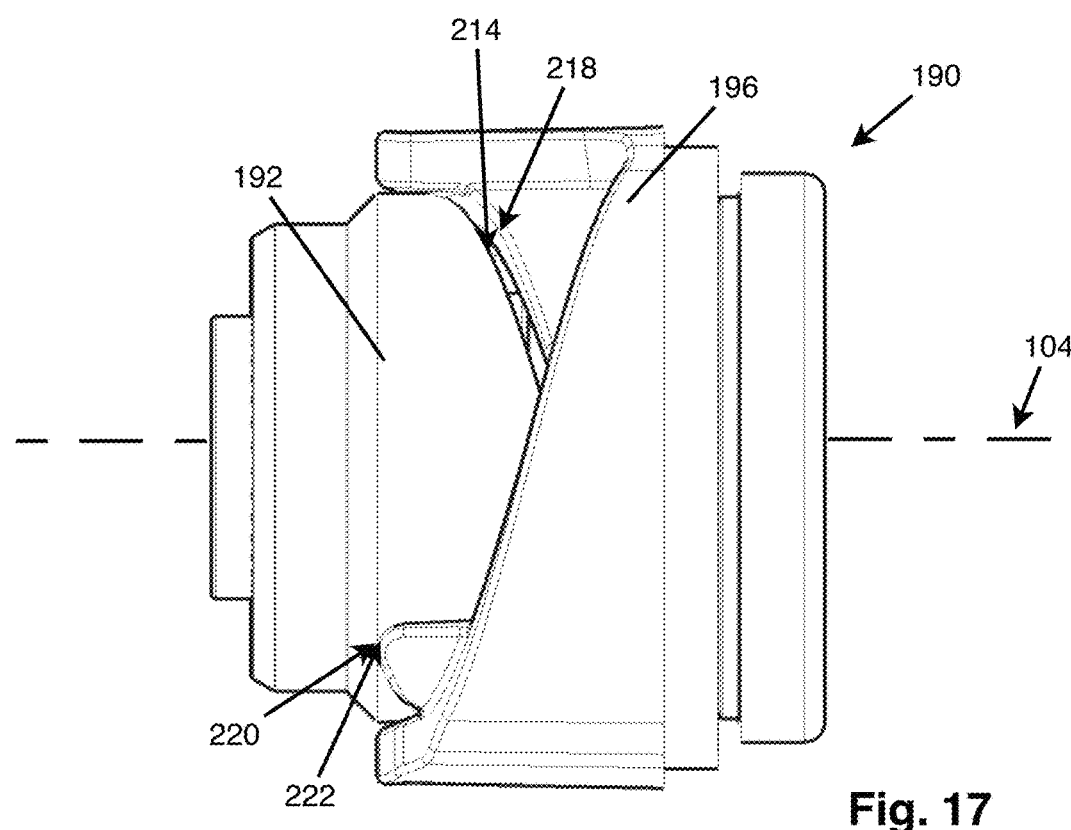
FIG. 17 is a side view of the scissor-ramp assembly of FIG. 15 without the static ring depicted.

Referring particularly to FIGS. 12 and 13, it depicts the axially-movable sheave 166 mounted to the output shaft 106 being axially movable. A guide surface 184 outwardly mounted to a cylindrical part 182, and a set of followers 186 mounted to the external face 174 of the axially-movable sheave 166 participate in forcing the output pulley 162 to automatically adjust the width of V-shaped groove 172 as the width 154 of the V-shape groove 152 of the actuated pulley 142 (see e.g., FIG. 8) changes when under some conditions.

Referring now additionally to FIGS. 14 to 17, the actuator motor 134 and the axially-movable sheave 146 of the actuated pulley 142 are coupled through a scissor-ramp mechanism 190 controlling the width 154 of the V-shaped groove 152 by pushing the axially-movable sheave 146. The scissor-ramp mechanism 190 comprises an actuated ring 192 (a first driving ring) that is free to rotate around the input axis 104, and a static ring 198 that has a static position along the input axis 104 and that is prevented from rotating. By forcing the actuated ring 192 to rotate, the actuator assembly 130 actuates the scissor-ramp mechanism 190 that forces the axially-movable sheave 146 to axially move towards the axially-fixed sheave 144 or release pressure over the axially-fixed sheave 144.

Accordingly, the scissor-ramp mechanism 190 used in the present CVT 100 has an actuator motor 134 (see e.g., FIG. 10) controlling rotation of the actuated ring 192. The actuated ring 192 comprises a first ramp 214 which provides a driving abutting facet 218 adapted to exert the driven ring 196 to move axially. The contacting location, hereinafter the contacting section 220, between the ramp 214 and a first driven abutting facet 222 of the driven ring 196, as the driven ring 196 moves axially, is accompanied with a migration of the contacting section 220 of the driving abutting facet 218 over the ramp 214.

It is worth to mention that ramps, ring edge profiles, or ring profiles are used to point out the interfacing surfaces when contacts occur between rings. Similarly, abutting facets and contacting section are intended to designate contacting interfaces and instant contacting surfaces, unless specified otherwise.

With the present CVT 100, as the actuator motor 134 operates in one direction, the axially-movable sheave 146 is pushed by the scissor-ramp mechanism 190 creating the required pinching force on the belt 160. When the actuator motor 134 operates in the other direction, a constraint is gradually released from the axially-movable sheave 146, allowing the belt 160 to slide toward the shaft 102.

Figure 18:
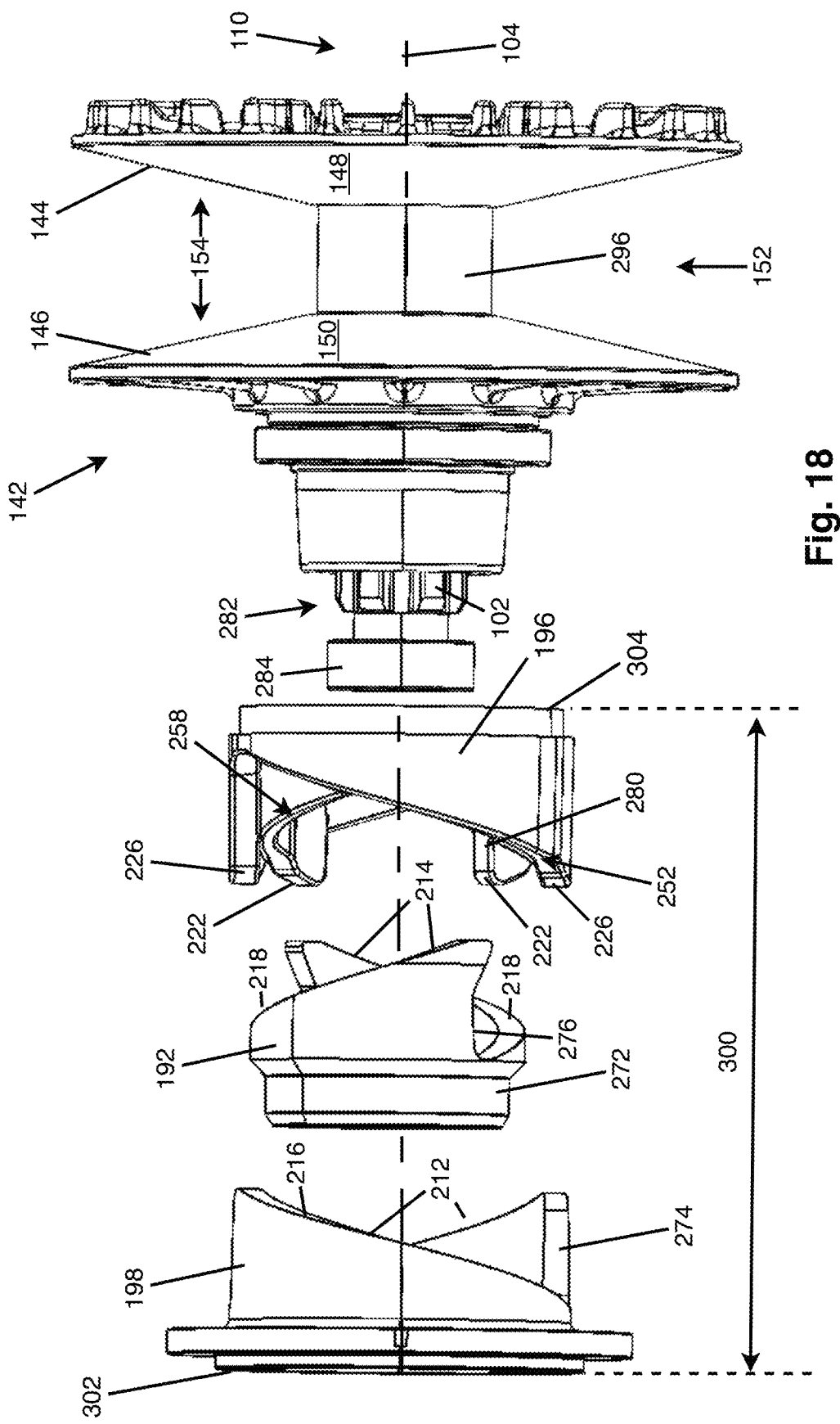
FIG. 18 is an exploded side view of the actuated pulley.

Referring now additionally to FIG. 18, the actuated ring 192 is mounted to the input shaft 102 distant from the input end 110 of the input shaft 102 at a preset distance from the axially-fixed sheave 144.

It is to worth mentioning that the components of the actuated pulley 142 and the scissor-ramp mechanism 190 are not rotatably coupled. The actuated pulley 142 is rotated by the engine or the inertia of the vehicle. The scissor-ramp mechanism 190 is rotated by the actuator assembly 130. The scissor-ramp mechanism 190 constraints the axial position of the axially-movable sheave 146.

Still referring particularly to FIG. 18, static ring 198 comprises an outer-ring ramp 212 having an abutting facet 216. The actuated ring 192 comprises an inner-ring ramp 214 having an abutting facet 218. Thus, the inner-ring ramp 214 and outer-ring ramp 212 providing concentric abutting facets 216, 218 of opposed spin directions, each being a revolution volume defined around the input axis 104.

The actuated ring 192 and the static ring 198 feature a number of, e.g., 2, inner abutting ramps, substantially shaped like a section of a helix, or in this case as a section of a double helix, extending in the opposed direction, aka the ramps of the actuated ring 192 extending towards the input end 110 of the input shaft 102 while the static ring 198 in the same angular direction extends away from the input end 110 of the input shaft 102. The ramps 214 are providing abutting facets 218 that are interfacing with the driven ring 196, adapted to push the driven ring 196 as the actuated ring 192 rotates in the first direction, and release pressure over the driven ring 196 in the opposite direction.

The driven ring 196 comprises an inner-ring section 258 and an outer-ring section 252. Each one of the inner-ring section 258 and of the outer-ring section 252 comprise two abutting facets 222, 226 for contact with the abutting facets 216, 218 of the actuated ring 192 and of the static ring 198.

It is worth noting that the double helix shape of the rings 192, 198 and 196 allows to have end-of-course walls 274, 276, 280 limiting relative rotations of the rings between two extreme angular positions corresponding to a compressed position of the scissor-ramp mechanism 190 and an extended-most position of the scissor-ramp mechanism 190.

It is further worth noting that the input shaft 102 comprises a splined section 282 ensuring common rotation of the sheaves 144, 146, preventing slippage of the belt 160 over the sheaves 144, 146.

Figure 25:
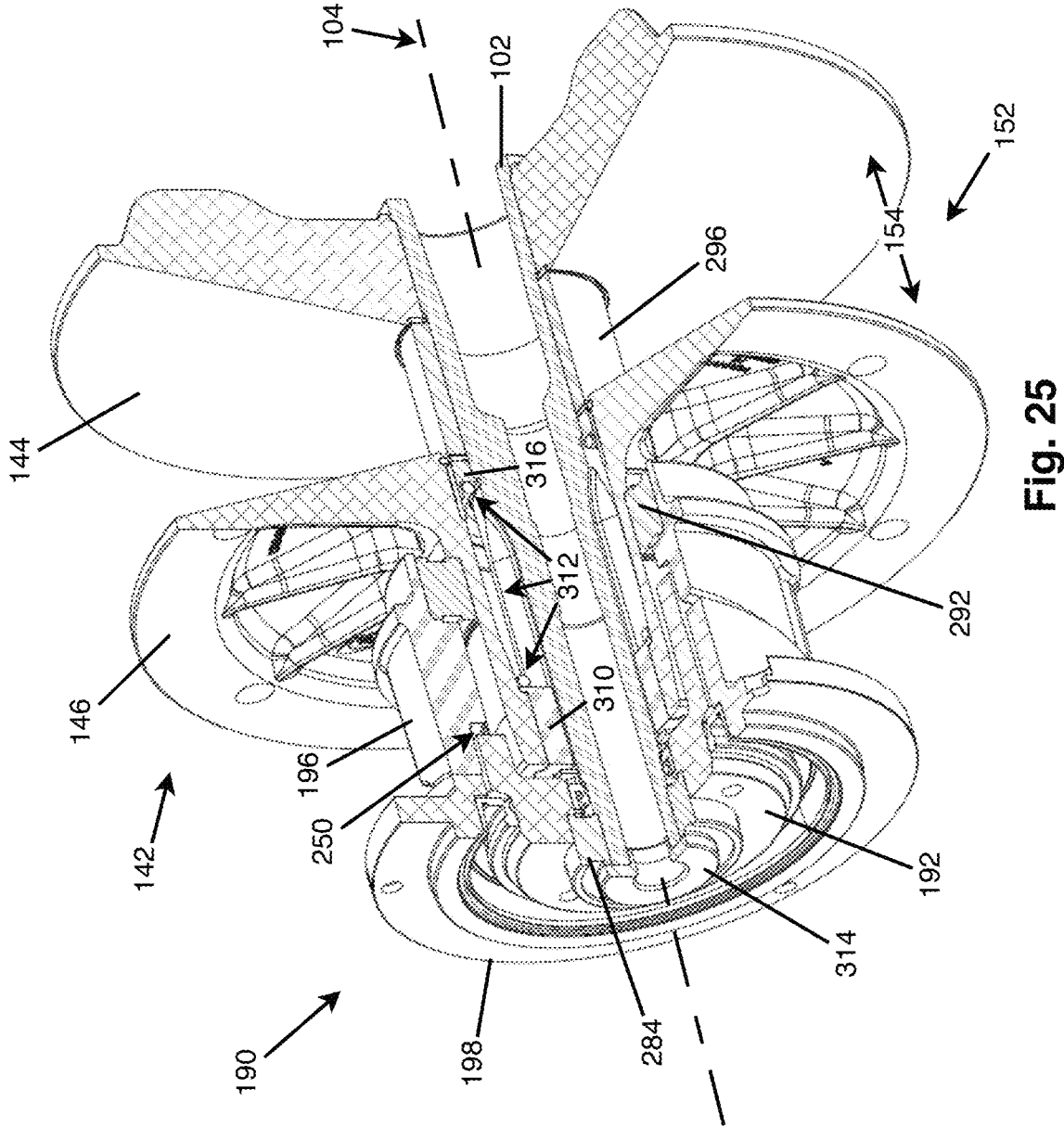
FIG. 25 is an isometric perspective partial cross-section view of an assembly of a pulley and of a scissor-ramp mechanism in accordance with an embodiment.

It is further worth noting that preferably a biasing means, such as a spring 312, FIG. 25, is used to speed up the scissor-ramp mechanism 190 to release pressure over the axially-movable sheave 146. According to embodiment, feature for biasing the scissor-ramp mechanism 190 toward its compressed position may vary in nature and in position in the assembly. The scissor-ramp mechanism 190 may further comprise bearings, such as bearing 284, which should be illustrated left to the actuated ring 192 on FIG. 18.

Through FIG. 18, it is depicted that the scissor-ramp mechanism 190 has an axial dimension 300, between the surface 302 of the driving rings 192, 198 that is the most distant to the axially-movable sheave 146, and the surface 304 of the driven ring 196 pushing (directly or indirectly) over the axially-movable sheave 146. That (minimum) axial dimension 300 increase and decrease with the rotation of the actuated ring 192.

Figure 19:
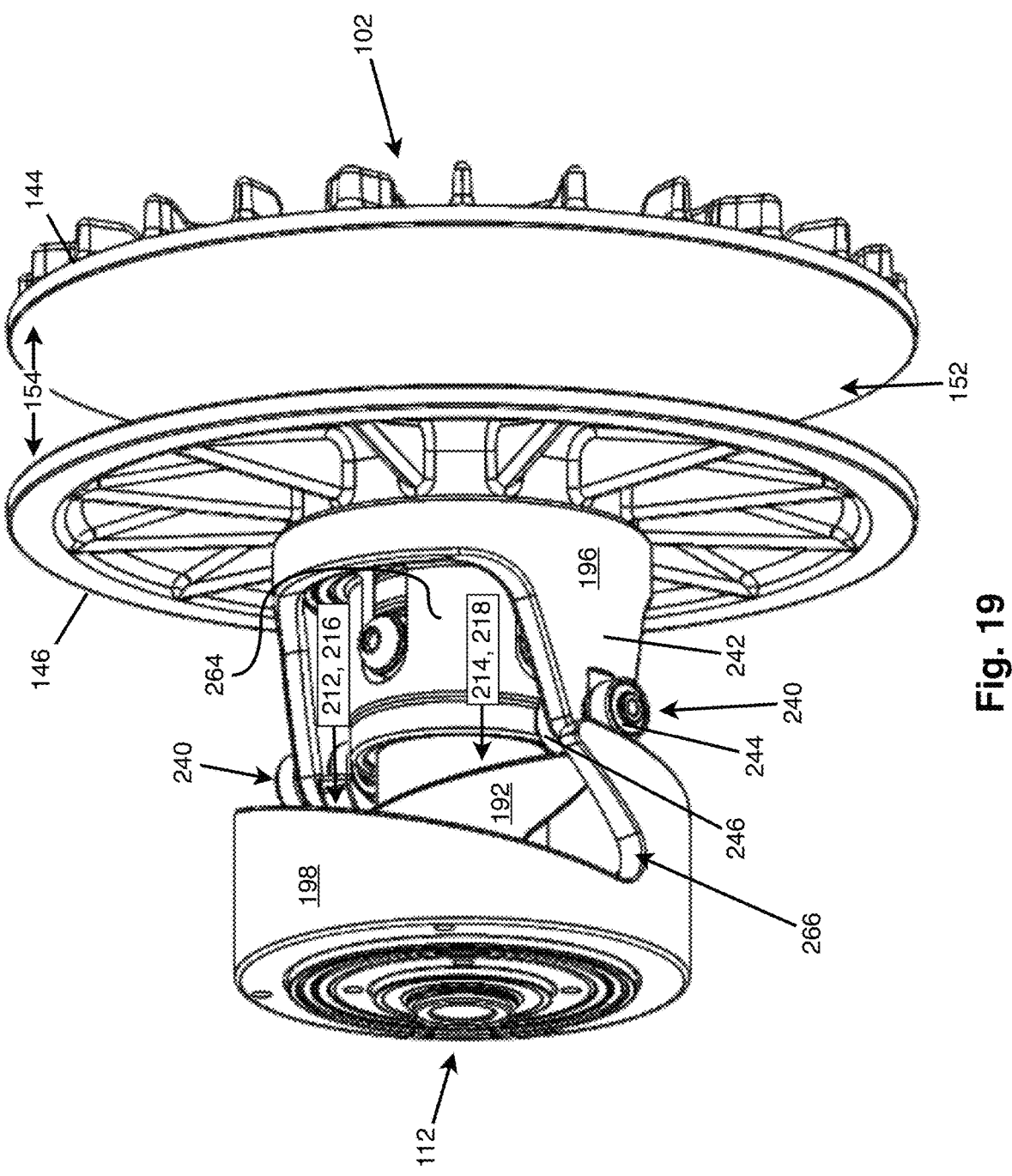
FIG. 19 is side view of a scissor-ramp assembly with rollers and an actuated pulley in accordance with another embodiment.

Referring now to FIG. 19, there is depicted an embodiment wherein some abutting facets are provided through bearing assemblies, aka rollers 240, instead of static contact surfaces. With this embodiment, it is particularly visible that the actuated ring 192 and the static ring 198 cooperate to push or release pressure in a scissor-like motion over the driven ring 196 when rotating, providing a smoot exerted motion to the driven ring 196.

The actuated ring 192 and the static ring 198 comprises ramps 212, 214, providing abutting facets 216, 218 adapted to push and release pressure over the driven ring 196 when the actuated ring 192 rotates. More precisely, outer rollers 244 are interfacing with the abutting facets 216 provided by the ramps 212 of the static ring 198, and inner rollers 246 are interfacing with the abutting facets 218 of provided by the ramps 214 of the actuated ring 192. Contact between the ramps 212 and the outer rollers 244, in combination with contact between the ramps 214 and the inner rollers 246, allow, when rotating the actuated ring 192 and thereby the ramps 214 of the actuated ring 192, to gradually push the rollers 240 away from the actuated ring 192 up to a limit position of the axially-movable sheave 146, e.g., the axially-movable sheave 146 abutting the axially-fixed sheave 144.

It is worth noting that such an embodiment allows to have helix sections comprising recess floor 266 adapted to pull the rollers 240 towards the actuating end of the shaft. Furthermore, with that embodiment, the body 272 of the dimension driven ring 196 is dimensioned in-between the dimension of the actuated ring 192 and of the static ring 198, with the rollers 240 extending radially inward and outwards to provide the abutting facets adapted to contact the actuated ring 192 and the static ring 198.

In the depicted embodiment, the helix sections are more precisely double-helix sections features sections of two helixes raising symmetrical relative to the input axis 104.

It is here further contemplated therein that the ramps and the abutting facets may be flat as illustrated, or have an alternative shaped for favoring easy sliding therebetween.

It is herein also contemplated that the sum of the rotational travel courses of the actuated ring 192 may go beyond the covered angle of the ramp. Sliding of the contacting section increases the number of angles to be rotated before the contacting section reaching the limit position.

It is thereby contemplated that the rotation angle of the actuated shaft 112 between the minimum opening between the sheaves 144, 146 and the maximum opening between the sheaves 144, 146 may be greater than the angle of the course of a single helix section.

For instance, the angle of the course of the helix section depicted on FIG. 18 is about 150 degrees, and the rotation exerted over the actuated shaft 112 for the rollers 244, 246 to travel such the V-shaped groove 152 broadens between its narrowest and its broadest limit is about three hundred (300) degrees.

For illustration purpose of the operation of a scissor-ramp mechanism 190, in FIG. 19 the input shaft 102 is depicted on the right side on FIG. 19, and the actuated shaft 112 is coupled to an actuator assembly 130 (not depicted on FIG. 19) being a means of rotation controlling the push exerted over the actuated ring 192. In the illustrated position, the actuated ring 192, under an actuated rotation through the actuated shaft 112 pushes the driven ring 196 to one of its limits, aka pushing axially-movable sheave 146 to its limit position closest to the axially-fixed sheave 144, resulting in the width 154 of the V-shaped groove 152 being at its narrowest position, and the belt being force outward by the V-shaped groove 152.

In opposition, when the actuated shaft 112 is actuated in the opposed direction, the outer-ring ramp 212 and the inner-ring ramp 214 are moved away from the rollers 240, providing room for the actuated pulley 142 to move away from the axially-fixed sheave 144. In an embodiment, this motion away from the axially-fixed sheave 144 is exerted through tension exerted by the belt 160 in the V-shaped groove 152. This motion is limited by the opening between the sheaves 144, 146 reaching a maximum opening, limited, e.g., by rollers 240 reaching an end-of-course position, e.g., abutting end-of-course walls.

Is it worth noting that the outer-ring ramp 212 and the inner-ring ramp 214 through their opposed direction slope, aka one raising toward the bearing 194 in a clockwise direction and the other raising toward the bearing 194 in an anticlockwise direction, provide a scissor-like pressure against the rollers 244, 246 thereby providing a smooth push over the rollers 244, 246 in a balanced manner.

It is however to be noted that many variation in slopes for the ramps are available other than the one described therein.

In the depicted embodiment, the driven ring 194 comprises a hub component 264 coupled with the wall 242, with the hub component 264 rotating with the sheaves 144, 146 and being axially movable over the input shaft 102. The wall 242 and the hub component 264 are coupled such that they can rotate free from one another while they axially move together when the axially-movable sheave 146 moves axially.

It is worth mentioning that, according to a first depicted embodiment, the opposed sloped of the outer directions of the surfaces of the static ring 198 and the actuated ring 192 are of a regular helix shape with a similar slope, aka a constant raise rating in length unit per degree of rotation over about all the section of the helix. It is contemplated herein that the raise rating of the surfaces of the static ring 198 and the actuated ring 192 may differ between the outer-ring ramp 212 and the inner-ring ramp 214. It is further contemplated that the raise rating may be irregular or inconstant, e.g., sinusoidal, thereby having the rotation of the actuated shaft 112, e.g., providing a modulated push/release effect on the actuated pulley 142 when close to the narrowest V-shaped groove 152 compared to when close to the broadest V-shaped groove 152.

It is further worth mentioning that, when pressure is released over the rollers 244 and 246, the axially-movable sheave 146 may not move instantaneously to occupy the free room. Two follow-securing options are herein contemplated to limit the room available to the axially-movable sheave 146 away from the axially-fixed sheave 144 before being forced to occupy the room.

A first follow-securing option depicted through FIG. 19 resides in at least one of the static ring 198 and the actuated ring 192 of the actuated rings 192 featuring recess floor 266 generating a generally room partially enclosing rollers 240 and thereby compelling the rollers 240 to remain thereinto when pressure is released from over the rollers 240 by the actuated ring 192. If the axially-movable sheave 146 is not following fast enough, the recess floor 266 are adapted to push the rollers 244, 246 away from the pulley 142.

A second option, depicted in FIG. 25, resides in having a spring 312 adapted to push the axially-movable sheave 146 or the driven ring 196 away from the axially-fixed sheave 144. Thereby, both the pressure exerted by the belt 160 to broaden the V-shaped groove 152 and the spring operate to ensure a good time-response in the axially-movable sheave 146 moving while requiring low additional power to the actuator motor 134.

It is worth mentioning that design of a CVT involves consideration of different conditions in term of idle mode, speed, power transmission, etc. that the CVT must be able to face. Currently, much of these conditions are considered through modulation by a processor and signals transmitted to the actuator motor 134. Other are considered through mechanical components limiting the aggressivity of belt contacts and response time to increase or decrease of requirements such as pressure of the axially-movable sheave 146 toward the axially-fixed sheave 144. In the present embodiments, mechanically responses are contemplated in relation with the actuated pulley 142, inter alia, through a combination of the ramp 212, 214, of a compressible component, e.g., wave spring adapted to slightly damp abrupt pressure exerted over the axially-movable sheave 146, and one or a combination of the follow-securing options described before. Such combination of mechanical solutions lightens up requirements regarding the software controlling the actuator motor 134 in terms of commands, of response time, and further in term of sensor precision and response time of the sensors. When considered together, they both increase the robustness of the CVT and decrease its cost.

It is further herein contemplated that rollers 240 of FIG. 19 may be replaced be sloped contact surfaces adapted to for sliding freely over one other when rotating is actuated on an actuated ring 192. This embodiment, by avoiding the necessity of having a clearance allows a more compact design.

It is herein contemplated that the driven ring 196 may be made of two components coupled to operate as driven ring 196. In an alternative embodiment, the driven ring 196 may be manufactured as a unibody component.

It is herein contemplated that the rings may have a greater or a smaller number of ramps than the two (2) ramps depicted through the present embodiments.

It is herein contemplated that rings, such the actuated ring 192, may not feature recess floor 266. For example, end-of-course walls may be used to limit the course of the axially-movable sheave 146 away from the axially-fixed sheave 144 without having pulling effect associated therewith.

It is herein further contemplated that instead of having recess floors 266, the actuated ring 192 may feature slightly recessed or straight walls extending from the upmost point of the surfaces of the static ring 198 and the actuated ring 192 toward the actuated shaft 112, decreasing or eliminating the needs of machining a e.g., molded piece to obtain an operational actuated ring 192.

It is herein contemplated that the present design allows to manufacture e.g., the actuated ring 192 or the driven ring 196 in a polymer material adapted with acceptable frictional characteristics, strength, and resistance to heat. In one embodiment, the driven ring 196 is made of metal while the actuated ring 192 is made of polymer. In another embodiment, the driven ring 196 is made of polymer while the actuated ring 192 is made of metal. In another embodiment, both are made of polymer, either the same polymer or distinct polymer. Plating and other surface-processing are also contemplated.

It is further worth mentioning that the present design, through the presence of physical end-of-course for the actuator rotation through e.g., narrowest limit of the V-shaped groove 152, broadest limit of the V-shaped groove 152, abutment surface(s) such as the recess floor 266 limiting the course between the actuated ring 192 and the driven ring 196, initial settings and resetting of the actuator motor 134 becomes simpler than alternative CVTs wherein such end-of-courses may be more virtual.

Figure 20:
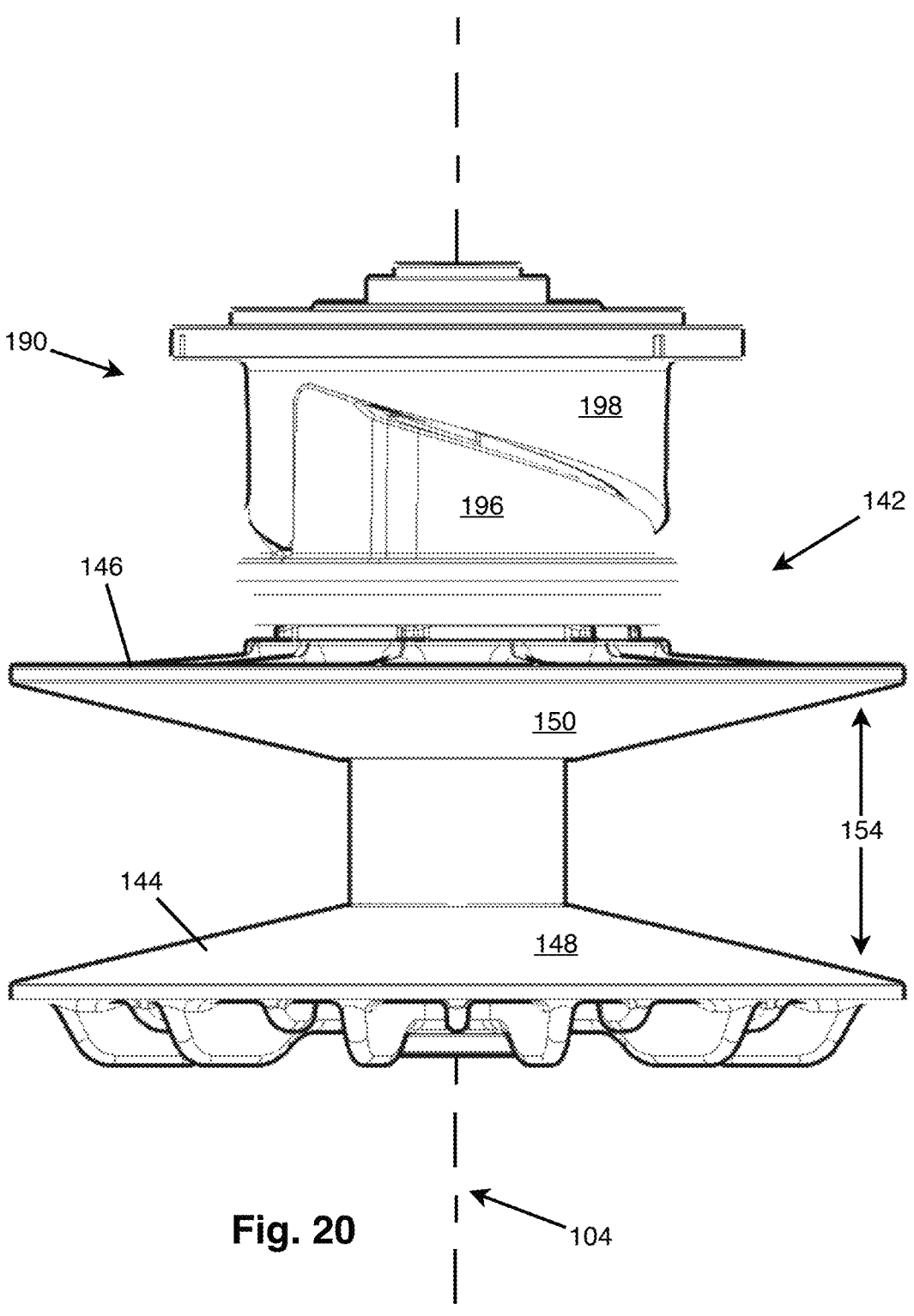
FIG. 20 is a side view of an assembly comprising a pulley and a scissor-ramp mechanism in a compact-most position in accordance with an embodiment.
Figure 21:
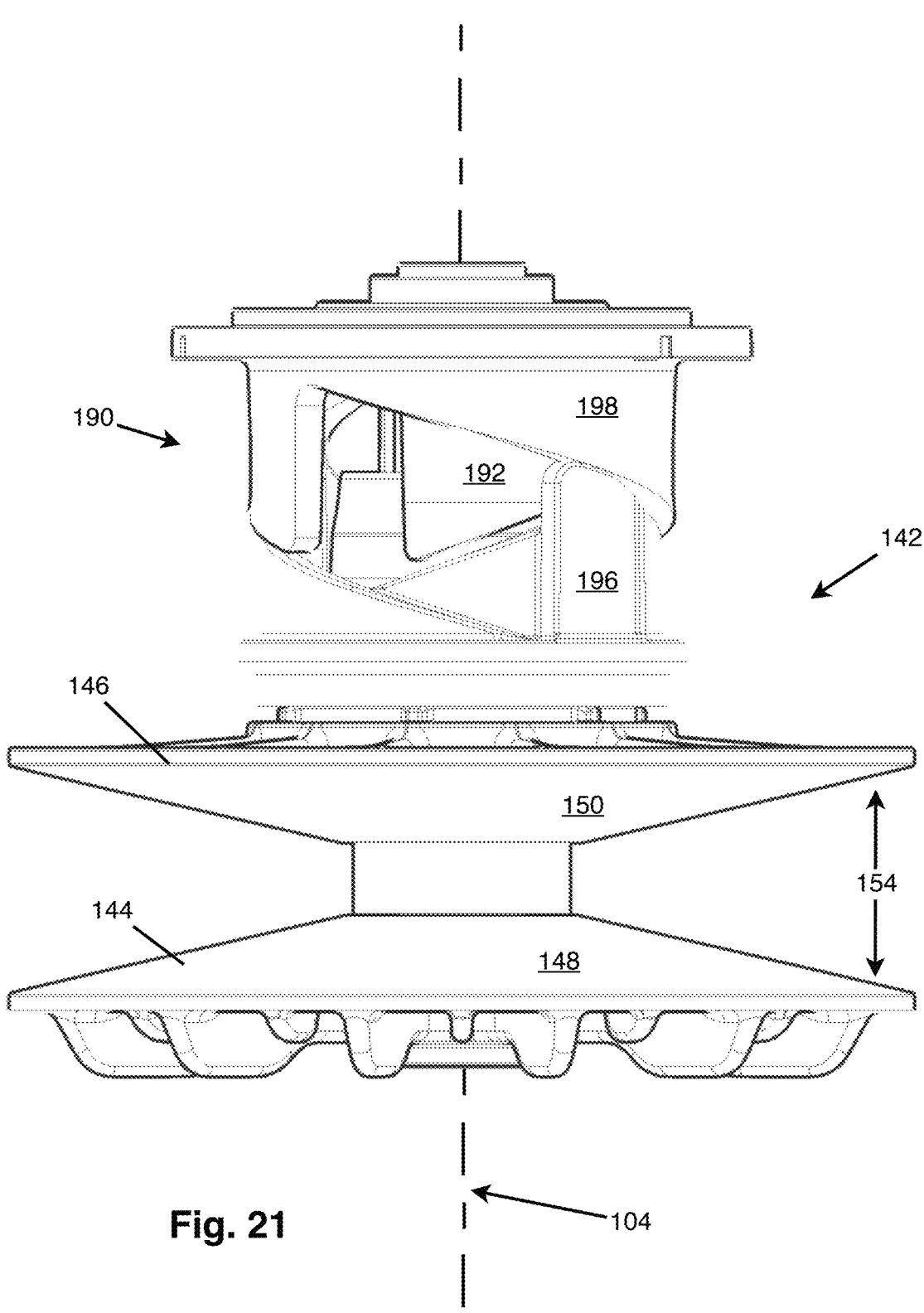
FIG. 21 is a side view of the assembly of FIG. 20 with the scissor-ramp mechanism in an intermediary position.
Figure 22:
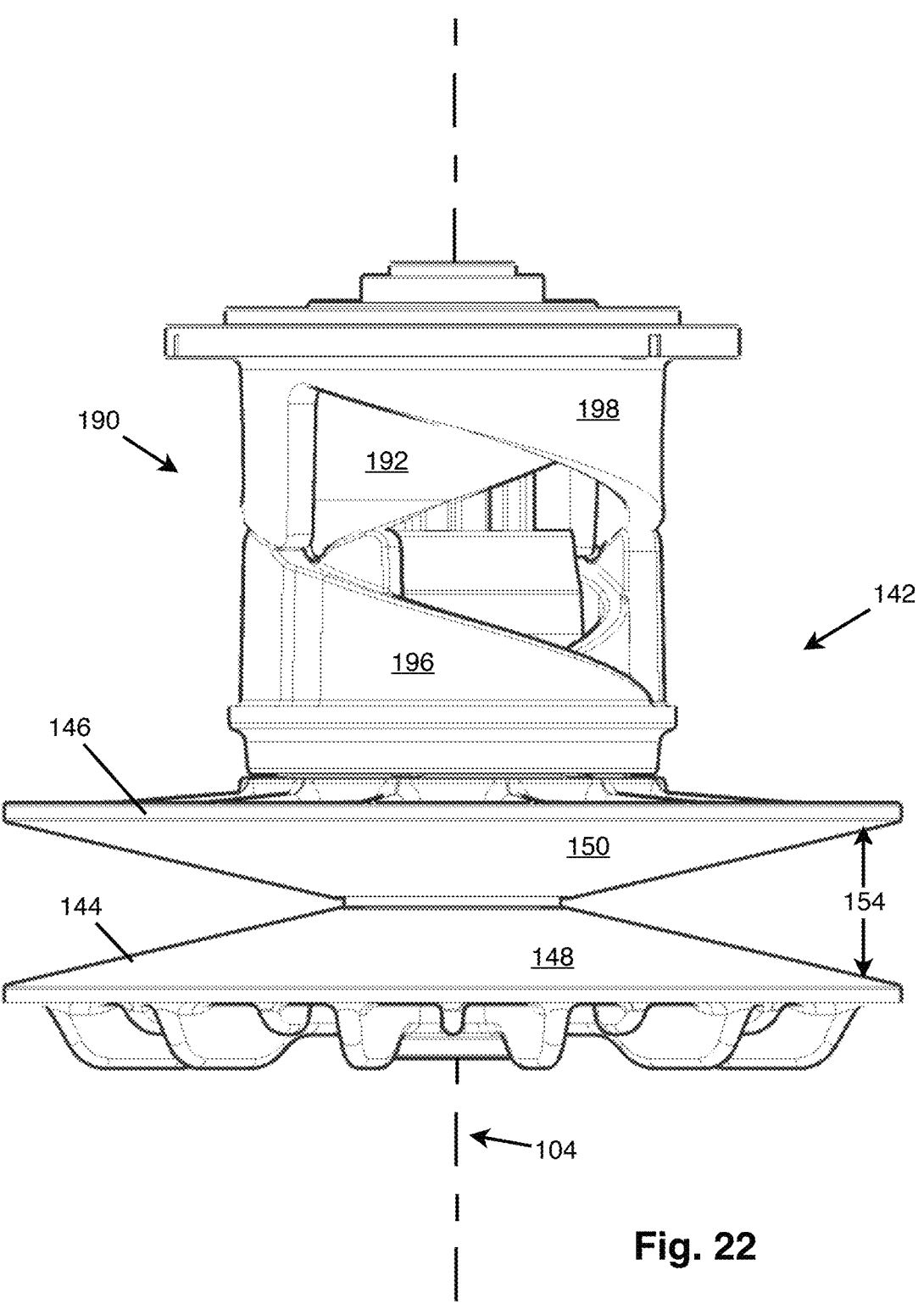
FIG. 22 is a side view of the assembly of FIG. 20 with the scissor-ramp mechanism is in an extended-most position.

Referring now to FIG. 20, FIG. 21 and FIG. 22, an actuated pulley 142 of an embodiment is depicted on multiple positions. In FIG. 20, the scissor-ramp mechanism 190 is the compact-most position, providing the least axial constraint on the axially-movable sheave 146, and thus with the width 154 for the V-shaped groove 152. In this position, the actuated pulley 142 is adapted to provide the lowest speed and the most force to the belt 160 for when starting the vehicle. In FIG. 21, the scissor-ramp mechanism 190 is an intermediary position, providing some axial constraint on the axially-movable sheave 146, and providing less width for the V-shaped groove 152 than with the position of FIG. 20. In FIG. 22, the scissor-ramp mechanism 190 is the extended-most position, providing the most axial constraint on the axially-movable sheave 146, and thus with the minimum width 154 for the V-shaped groove 152. In this position, the actuated pulley 142 is adapted to provide the fastest speed to the belt for when the vehicle is running at high speed.

Figure 23:
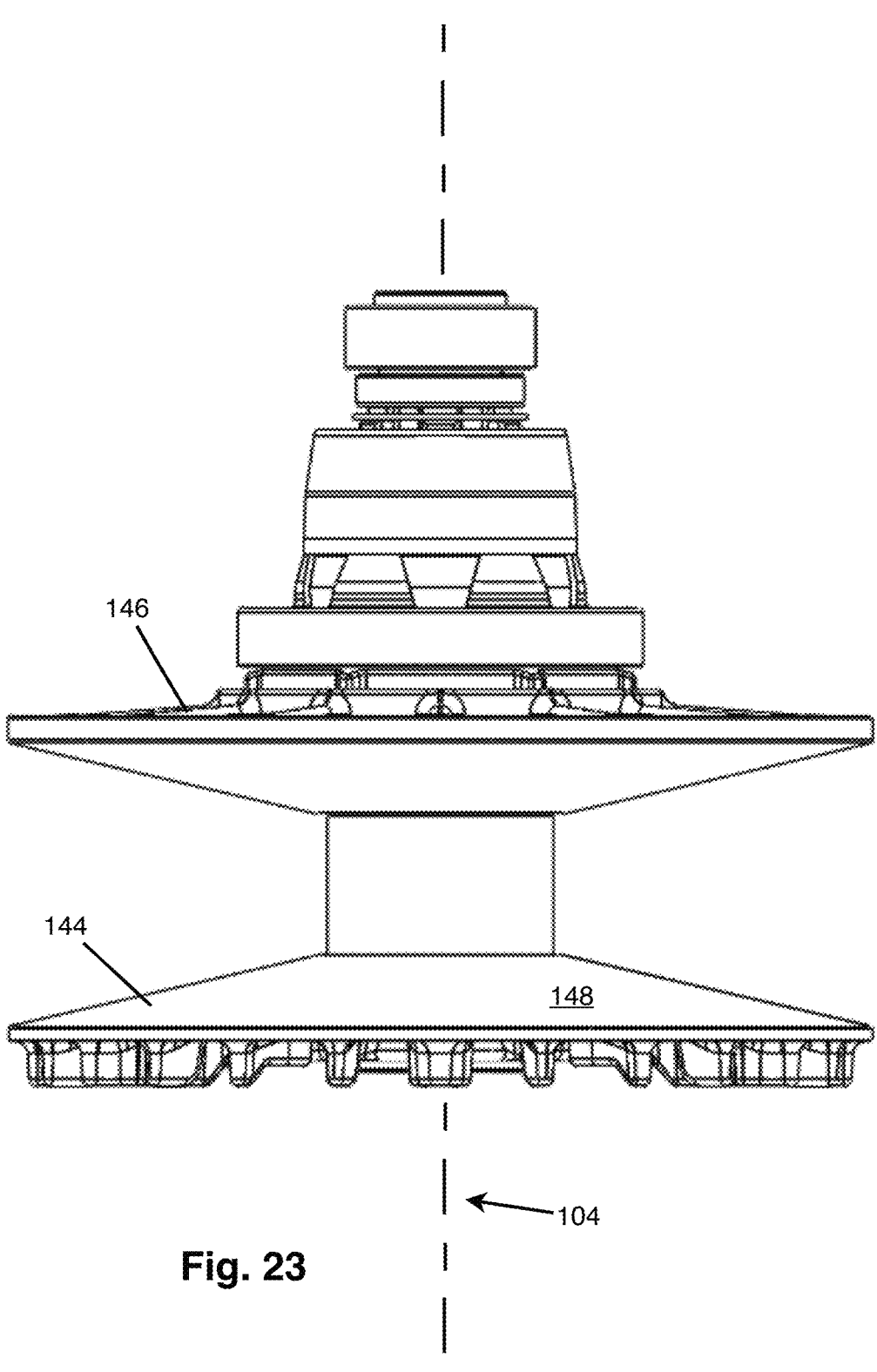
FIG. 23 is a side view of the assembly of FIG. 20 without the scissor-ramp mechanism depicted.

Referring now additionally to FIG. 23, the actuated pulley 142 is depicted without the scissor-ramp mechanism 190. In FIG. 23, an assembly comprising axially-movable sheave 146 is depicted to show that the scissor-ramp mechanism 190 is mounted to the input shaft 102 such as being free to rotate, with the actuated ring 192 being rotatably coupled to the actuated shaft 112 (depicted in FIG. 11).

It is worth mentioning that in embodiments, a spring 312 is introduced to exert displacement of the axially-movable sheave 146 away from the axially-fixed sheave 144 when the scissor-ramp mechanism 190 decreases its constraint against the axially-movable sheave 146.

Figure 24:
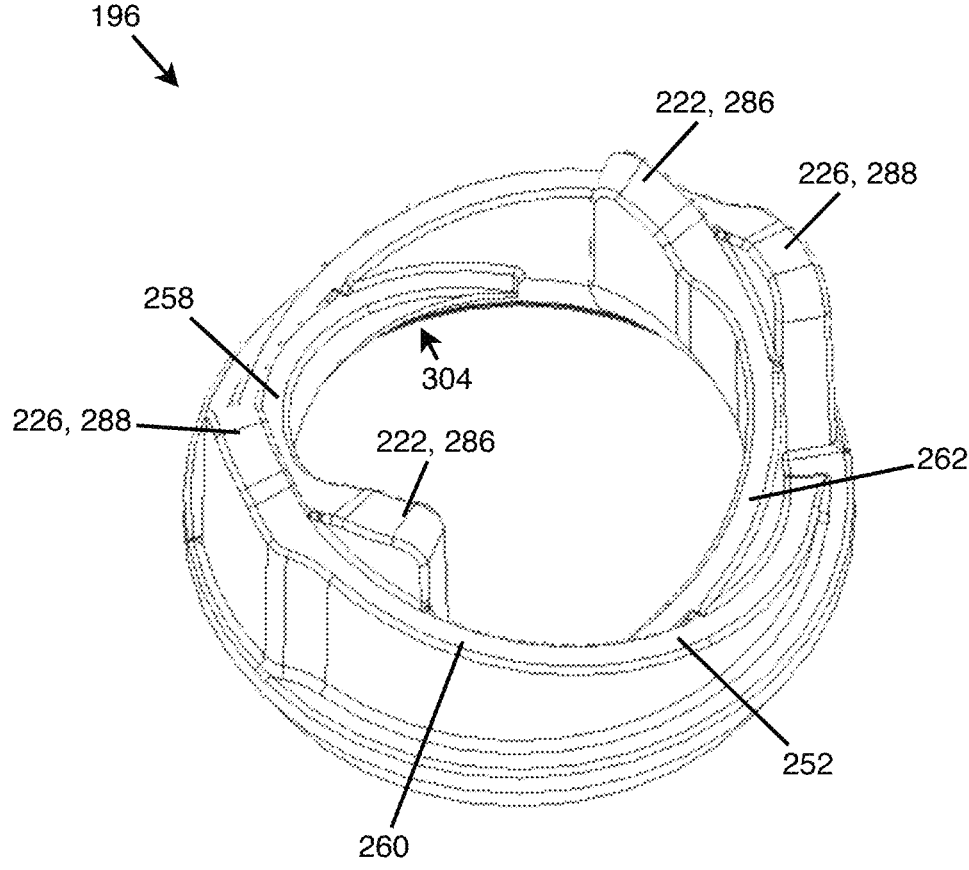
FIG. 24 is a perspective view of a monobloc driven ring in accordance with an embodiment.

Referring now to FIG. 24, in one embodiment, the driven ring 196 comprises an inner-ring section 258 and an outer-ring section 252. Each one of the inner-ring section 258 and of the outer-ring section 252 comprise two abutting facets 222, 226 for contact with the abutting facets 216, 218 of the actuated ring 192 and of the static ring 198 (not depicted in FIG. 24), with the abutting facets 222, 226 being located about the top of the ramps 260, 262. The ramps 260, 262 provide clearance below the abutting facets 222, 226, thus a clearance-providing section, for the contacting sections 286, 288 remaining static on the abutting facets 222, 226 while their counterparts on the actuated ring 192 and the driven ring 196 are migrating on the ramps 212, 214 when actuating the actuated ring 192.

According to an embodiment the abutting facets 222 of the inner-ring section 258 and the abutting facets 226 of the outer-ring section 252, as the respective ramps 260, 262 are offset relative to one another.

Referring now to FIG. 25. It depicts a cross-section view of the scissor-ramp mechanism 190 and of the actuated pulley 142 in accordance with an embodiment. FIG. 25 shows from left to right (actuated side to input side) the actuated ring 192 and the static ring 198 concentric to each other. The driven ring 196 is right to the actuated ring 192 and the static ring 198, abutting both. Clearance 250 is visible at the interfaces in the cross-section view since the contacting section between the driven ring 196 and the driving rings 192, 198 are not at the locations of the cross-sections planes. Right to the driven ring 196, a bearing 292 takes place between the driven ring 196 and the axially-movable sheave 146, providing an intermediary for the scissor-ramp mechanism 190 to constrain the width 154 of the V-shaped groove 152 of the actuated pulley 142.

According to the embodiment, a bearing 296 takes place over the input shaft 102 with the axially-movable sheave 146 adapted to slide over and away from the bearing 296 when moving axially, such that the bearing 296 provides a controllable disconnection between the input shaft 102 and the belt 160 (not depicted in FIG. 25).

According to an embodiment, the axially-movable sheave 146 is coupled to the input shaft 102 through a splined coupling component 310 adapted to ensure free axial displacement of the axially-movable sheave 146 while ensuring that the axially-movable sheave 146 is rotationally coupled to the input shaft 102.

A spring 312 is mounted to the input shaft 102, enclosed between the bearing 296 on the input side and combination of the axially-movable sheave 146 and of the splined coupling component 310 on the actuated side. The spring 312 exerts the axially-movable sheave 146 towards the left opposite to the input side, pushing over the input shaft 102.

The embodiment further comprises bearing 284, 316, seals (not identified), mounting clip (not identified) and washer 314 ensuring general positioning of the components of the scissor-ramp mechanism 190 and of the actuated pulley 142 over the input shaft 102, and easy maintenance of these components.

It is worth mentioning that according to an embodiment, none of the rings 192, 196, 198 are fixedly coupled to the actuated pulley 142. The pulley 142 can rotate at its own speed, with the scissor-ramp mechanism 190 having autonomous rotation and transmitting only axial constraints thereto.

According to a perspective, is presented a method of operating a CVT comprising:
  a) providing a scissor-ramp mechanism adapted to constrain the groove width, comprising:
    i) driving rings that are coaxial, concentric to each other, and rotatable relative to one another around the axis, each one of the driving rings comprising a driving abutting facet; and
    ii) a driven ring rotatable around the axis, the driven ring comprising driven abutting facets,
    wherein at least one abutting facet among the driving abutting facets and the driven abutting facets is provided by a first helicoidal ramp;
    and
  b) rotating the driving rings one relative to another in a first spin direction through which the driving abutting facets are abutting against the driven abutting facets with a contacting section of the abutting facet provided by the first helicoidal ramp being exerted to migrate thereover in a first migrating direction, thereby increasing an axial dimension of the scissor-ramp mechanism and thereby causing the groove width to decrease.

The method further comprising:
  c) providing a biasing means adapted to bias the driven ring towards the driving rings; and
  d) rotating the driving rings one relative to another in a second spin direction such that the contacting section being exerted to migrate thereover in a second migrating direction by the biasing means, thereby decreasing the axial dimension of the scissor-ramp mechanism causing the groove width to increase.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A scissor-ramp mechanism for a Continuously Variable Transmission (CVT), the scissor-ramp mechanism extending along a rotation axis, with the scissor-ramp mechanism being adapted for varying continuous its axial dimension, the scissor-ramp mechanism comprising:
  a first driving ring and a second driving ring that are coaxial, concentric to each other, and rotatable relative to one another around the rotation axis, each one of the first driving ring and the second driving ring comprising a driving abutting facet; and
  a driven ring rotatable around the rotation axis, the driven ring comprising driven abutting facets;
  wherein the driving abutting facets are adapted to abut against the driven abutting facets,
  wherein at least one abutting facet among the driving abutting facets and the driven abutting facets is provided by a first helicoidal ramp,
  wherein rotating the driving rings relative to one another exerts a contacting section of the abutting facet provided by the first helicoidal ramp to migrate thereover, thereby changing the axial dimension of the scissor-ramp mechanism, and wherein the scissor-ramp mechanism is mounted to a body and to a shaft rotatable relative to the body with the shaft axially coupled to the body, wherein one of the driving rings is fixedly mounted to the body.

2. The scissor-ramp mechanism of claim 1, wherein the driven ring is free of a mechanic coupling to the driving rings.

3. The scissor-ramp mechanism of claim 1, wherein rotating the driving rings relative to one another of a first number of degrees exerts a rotation of the driven ring of a second number of degrees that is less than the first number of degrees.

4. The scissor-ramp mechanism of claim 1, further comprising a second helicoidal ramp, wherein each one of the first helicoidal ramp and the second helicoidal ramp has a rate of an axial extent per degree of rotation, and wherein rotating the driving rings relative to one another exerts a variation of the axial dimension of the scissor-ramp mechanism per degree of rotation of the driving rings relative to one another that is lower than the maximum of the rates of the first helicoidal ramp and of the second helicoidal ramp.

5. The scissor-ramp mechanism of claim 1, wherein the first driving ring comprises the first helicoidal ramp and the second driving ring comprises a second helicoidal ramp.

6. The scissor-ramp mechanism of claim 5, wherein the first helicoidal ramp extends in a first spin direction, and wherein the second helicoidal ramp extends in a second spin direction opposed to the first spin direction.

7. The scissor-ramp mechanism of claim 1, wherein the first driving ring comprises the first helicoidal ramp and a second helicoidal ramp, and wherein the first helicoidal ramp and the second helicoidal ramp extend in a first spin direction, and wherein the first helicoidal ramp and the second helicoidal ramp are offset from one another of a number of degrees that is greater than zero (0).

8. The scissor-ramp mechanism of claim 1, wherein the first helicoidal ramp has a constant rate of an axial extent per degree of rotation between a first position and a second position, wherein the second position is axially distant to the first position of at least 75% of a maximum variation of the axial dimension of the scissor-ramp mechanism between an extended-most position and a compact-most position.

9. The scissor-ramp mechanism of claim 1, wherein the abutment facets comprises a roller.

10. The scissor-ramp mechanism of claim 1, wherein the driven ring comprises an outer-ring section and an inner-ring section each comprising an helicoidal axial face, wherein the helicoidal axial face of the outer-ring section comprises a first one of the abutting facets of the driven ring and the helicoidal axial face of the inner-ring section comprises a second one of the abutting facets of the driven ring.

11. The scissor-ramp mechanism of claim 10, wherein the abutting facet of the inner-ring section and the abutting facet of the outer-ring section are offset relative to one another of a number of degrees greater than zero (0) around the rotation axis.

12. The scissor-ramp mechanism of claim 10, wherein the helicoidal axial face of the outer-ring section comprises a clearance-providing section in which the helicoidal axial face provides a contact-free section relative to driving rings, wherein the contact-free section remains when the abutting facets of the driving rings abuts against the abutting facets of the driven ring.

13. A scissor-ramp mechanism for a Continuously Variable Transmission the scissor-ramp mechanism extending along a rotation axis, with the scissor-ramp mechanism being adapted for varying continuous its axial dimension, the scissor-ramp mechanism comprising:

a first driving ring and a second driving ring that are coaxial, concentric to each other, and rotatable relative to one another around the rotation axis, each one of the first driving ring and the second driving ring comprising a driving abutting facet; and a driven ring rotatable around the rotation axis, the driven ring comprising driven abutting facets:

wherein the driving abutting facets are adapted to abut against the driven abutting facets, wherein at least one abutting facet among the driving abutting facets and the driven abutting facets is provided by a first helicoidal ramp, wherein rotating the driving relative to one another exerts a contacting section of the abutting face vided by the first helicoidal ramp to migrate thereover, thereby changing the axial dimension of the scissor-ramp mechanism, wherein the driven ring comprises an outer-ring section and an inner-ring section each comprising an helicoidal axial face, wherein the helicoidal axial face of the outer-ring section comprises a first one of the abutting facets of the drive in ring and the helicoidal axial face of the inner-ring section comprises a second one of the abutting facets of the driven ring, and wherein the driven ring is made of a single component.

14. A scissor-ramp mechanism for a Continuously Variable Transmission (CVT), the scissor-ramp mechanism extending along a rotation axis, with the scissor-ramp mechanism being adapted for varying continuous its axial dimension, the scissor-ramp mechanism comprising:

a first driving ring and a second driving ring that are coaxial, concentric to each other, and rotatable relative to one another around the rotation axis, each one of the first driving ring and the second driving ring comprising a driving abutting facet; and a driven ring rotatable around the rotation axis, the driven ring comprising driven abutting facets, wherein the driving abutting facets are adapted to abut against the driven abutting facets, wherein at least one abutting facet among the driving abutting facets and the driven abutting facets is provided by a first helicoidal ramp, wherein rotating the driving rings relative to one another exerts a contacting section of the abutting facet provided by the first helicoidal ramp to migrate thereover, thereby changing the axial dimension of the scissor-ramp mechanism, wherein the driven ring comprises an outer-ring section and an inner-ring section each comprising an helicoidal axial face, wherein the helicoidal axial face of the outer-ring section comprises a first one of the abutting facets of the driven ring and the helicoidal axial face of the inner-ring section comprises a second one of the abutting facets of the driven ring, wherein the scissor-ramp mechanism is adapted to continuously adjust between a compact-most position and an extended-most position, and wherein the scissor-ramp mechanism further comprises biasing means biasing the scissor-ramp mechanism towards the compact-most position.

15. The scissor-ramp mechanism of claim 1, further comprising a second helicoidal ramp, wherein each one of the driving rings comprises one of the helicoidal ramps, wherein the helicoidal ramps are extending in opposite spin directions, and wherein rotating the driving rings relative to one another exerts the abutting facets of the driven ring to slide simultaneously over the helicoidal ramps of the driving rings.

16. A CVT comprising the scissor-ramp mechanism of claim 1, the CVT comprising an axially-fixed sheave, and an axially-movable sheave coaxially mounted to the scissor-ramp mechanism, wherein the scissor-ramp mechanism is adapted to push against the axially-movable sheave to adjust a width of a V-shaped groove between the sheaves.

17. The CVT of claim 16, further comprising an actuator assembly coupled to the scissor-ramp mechanism through the scissor-ramp mechanism shaft, wherein the actuator assembly is adapted for exerting a rotation of the driving rings relative to one another.

18. A method of operating a Continuously Variable Transmission (CVT) having a groove width constrained along a rotation axis, the method comprising:

a) providing a scissor-ramp mechanism adapted to constrain the groove width, comprising:

i) driving rings that are coaxial, concentric to each other, and rotatable relative to one another around the rotation axis, each one of the driving rings comprising a driving abutting facet; and ii) a driven ring rotatable around the rotation axis, the driven ring comprising driven abutting facets, wherein at least one abutting facet among the driving abutting facets and the driven abutting facets is provided by a first helicoidal ramp;

b) rotating the driving rings one relative to another in a first spin direction through which the driving abutting facets are abutting against the driven abutting facets with a contacting section of the abutting facet provided by the first helicoidal ramp being exerted to migrate thereover in a first migrating direction, thereby increasing an axial dimension of the scissor-ramp mechanism and thereby causing the groove width to decrease, c) providing a biasing means adapted to bias the driven ring towards the driving rings;

and d) rotating the driving rings one relative to another in a second spin direction such that the contacting section being exerted to migrate thereover in a second migrating direction by the biasing means, thereby decreasing the axial dimension of the scissor-ramp mechanism causing the groove width to increase.

* * * * *